US006459187B1

(12) United States Patent
Oohashi et al.

(10) Patent No.: US 6,459,187 B1
(45) Date of Patent: Oct. 1, 2002

(54) ALTERNATOR

(75) Inventors: Atsushi Oohashi; Katsumi Adachi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 8 days.

(21) Appl. No.: 09/634,849

(22) Filed: Aug. 8, 2000

(30) Foreign Application Priority Data

Jan. 20, 2000 (JP) ......................................... 2000-011680

(51) Int. Cl.⁷ ............................. H02K 9/02; H02K 3/04; H02K 15/02
(52) U.S. Cl. ........................ 310/216; 310/201; 310/206; 310/208; 29/605; 29/606
(58) Field of Search ................................ 310/216, 217, 310/218, 179, 180, 184, 198, 201, 206, 207, 208, 254, 258, 259; 29/596, 598, 605, 606

(56) References Cited

U.S. PATENT DOCUMENTS 2,400,902 A * 5/1946 Allen .......................... 310/201
3,436,812 A * 4/1969 Aoki et al. .................... 29/596
4,102,040 A * 7/1978 Rich ............................ 29/598
5,592,731 A * 1/1997 Huang et al. .................. 29/596
5,859,486 A * 1/1999 Nakahara et al. ............. 310/254
5,998,903 A * 12/1999 Umeda et al. ................ 310/179
6,081,059 A * 6/2000 Hsu ............................ 310/179
6,177,747 B1 * 1/2001 Maeda et al. ................ 310/179
6,268,678 B1 * 7/2001 Asao et al. .................. 310/201

FOREIGN PATENT DOCUMENTS

| DE | 196 33 399 A1 | 2/1998 |
| DE | 199-22-794 | 11/1999 |
| EP | 0 740 403 A1 | 10/1996 |
| JP | 63294242 A | 11/1988 |
| JP | 9-103052 | 4/1997 |
| JP | 11018378 A | 1/1999 |
| JP | 11-155270 | 6/1999 |

* cited by examiner

Primary Examiner—Nestor Ramirez
Assistant Examiner—Dang Dinh Le
(74) Attorney, Agent, or Firm—Sughrue Mion, PLLC

(57) ABSTRACT

A stator core is provided with a core abutting portion extending axially such that the stator core becomes an annular shape by abutting end surfaces of a parallelepiped laminated body, and a polyphase stator winding is provided with a winding connection portion axially aligned with the core abutting portion.

13 Claims, 26 Drawing Sheets

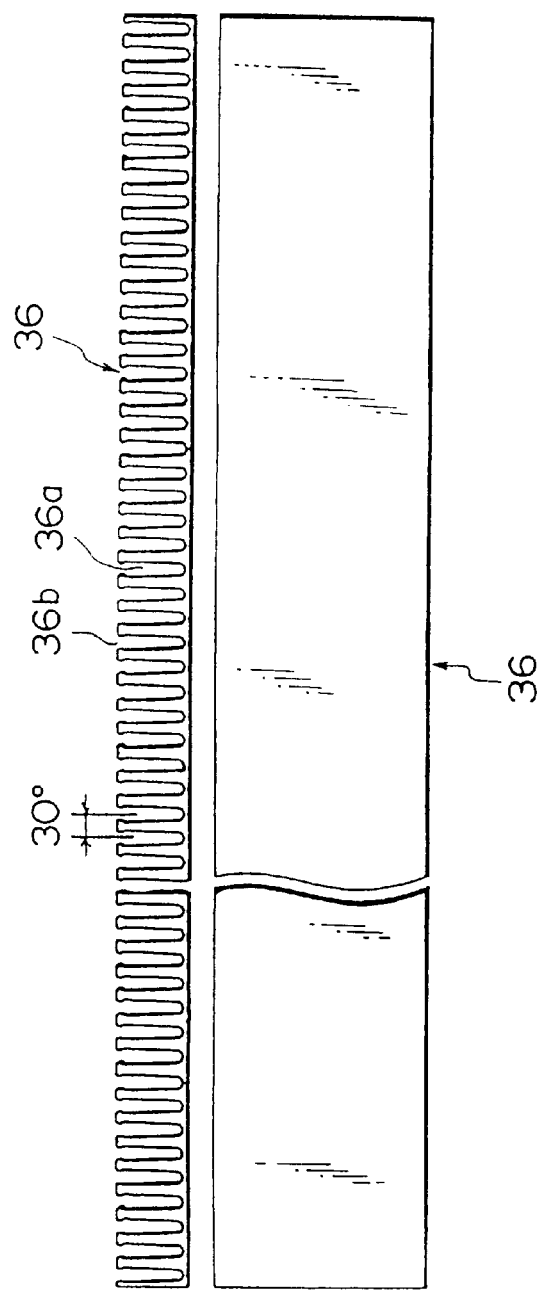

ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

FIG. 27 is an overall perspective of a stator for a conventional automotive alternator described in Japanese Patent Laid-Open No. HEI 9-103052.

This stator 140 includes: a cylindrical stator core 150 composed of a laminated core formed with a number of slots 150a extending axially at an even pitch in a circumferential direction; and a stator winding 170 wound onto the stator core 150. The stator winding 170 is a three-phase alternating-current winding composed of an a-phase alternating-current winding portion 170a, a b-phase alternating-current winding portion 170b, and a c-phase alternating-current winding portion 170c. a-phase, b-phase, and c-phase output wires Oa, Ob, and Oc and neutral-point lead wires Na, Nb, and Nc lead out of the respective alternating-current winding portions 170a, 170b, and 170c. In this example, the total number of slots 150a is thirty-six, which is one slot per pole per phase.

FIG. 28 is a winding diagram for the a-phase of the automotive alternator in FIG. 27.

The stator winding 170 is composed of the a-phase alternating-current winding portion 170a, the b-phase alternating-current winding portion 170b, and the c-phase alternating-current winding portion 170c, respectively, constructed by bundling round wire in which a copper surface is coated with insulation. The a-phase alternating-current winding portion 170a is constructed by wave winding into every third slot from slot number 1 to slot number 34. In this example, the wave winding folds back at slot 150a of slot number 34.

Moreover, although not shown, the b-phase alternating-current winding portion 170b and the c-phase alternating-current winding portion 170c are formed by offsetting each by one slot 150a.

The method for manufacturing the stator 140 shown in FIG. 27 will now be explained.

First, a laminated body 183, shown in FIG. 29, is formed by laminating strip-shaped bodies having a width of approximately 20 mm and a thickness of approximately 1 mm, for example. Next, as shown in FIG. 29, the a-phase alternating-current winding portion 170a, the b-phase alternating-current winding portion 170b, and the c-phase alternating-current winding portion 170c, which are first formed in a flat shape, are installed in the laminated body 183 so as to be stacked one on top of another. Then, the stator 140 is prepared by bending the laminated body 183 into a cylindrical shape by means of a forming device (not shown) and welding core abutting portions 184.

In the conventional alternator shown in FIG. 27, because the a-phase alternating-current winding portion 170a, the b-phase alternating-current winding portion 170b, and the c-phase alternating-current winding portion 170c are offset by one slot 150a each when they are installed, portions of the a-phase alternating-current winding portion 170a, the b-phase alternating-current winding portion 170b, and the c-phase alternating-current winding portion 170c are not installed in the laminated body 183 before the laminated body 183 is bent into the cylindrical shape, as can be seen from FIG. 29, and these portions must be inserted into the slots 150a of the stator core 150 after the stator core 150 has been formed into the cylindrical shape, and a problem has been that there is a risk that the insulation coating on the strands of wire may be damaged by contact with opening portions of the slots 150a which have become narrower at that stage due to the formation of the stator core 150 into the cylindrical shape.

Another problem has been that the manufacturing process is complicated by the troublesome step of having to insert portions of the alternating-current winding portions 170a, 170b, and 170c into the slots 150a after formation of the cylindrical shape.

Moreover, even in the conventional alternator in which the number of slots is two per pole per phase (a total of ninety-six) and two sets of three-phase alternating-current windings are installed in a stator core, portions of each of the alternating-current winding portions must be inserted after the cylindrical shape is formed, leading to the same problems as the alternator shown in FIG. 27.

SUMMARY OF THE INVENTION

The present invention aims to solve the above problems and an object of the present invention is to provide an alternator in which the occurrence of damage to the insulation coating on the strands of wire during the manufacturing process is reduced and the manufacturing process is simplified.

To this end, according to the present invention, an alternator comprising:
- a rotor for forming north-seeking (N) and south-seeking (S) poles alternately about a rotational circumference; and
- a stator comprising:
  - a stator core surrounding the rotor; and
  - a polyphase stator winding installed in the stator core,
  - the stator core being formed with a number of slots extending axially at a predetermined pitch in a circumferential direction,
  - the stator core being provided with a core abutting portion extending axially such that the stator core becomes an annular shape by abutting end surfaces of a parallelepiped laminated body, and
  - the polyphase stator winding is provided with a winding connection portion axially aligned with the core abutting portion.

BRIEF DESCRIPTION OF THE DRAWINGS

FIGS. 11(a) and 11(b) are a side elevation and a rear plan, respectively, explaining the construction of a stator core in FIG. 1;

DETAILED DESCRIPTION OF THE PREFERRED EMBODIMENTS

Constructions of automotive alternators according to preferred embodiments of the present invention will be explained below with reference to the drawings.

Embodiment 1

Figure 1:
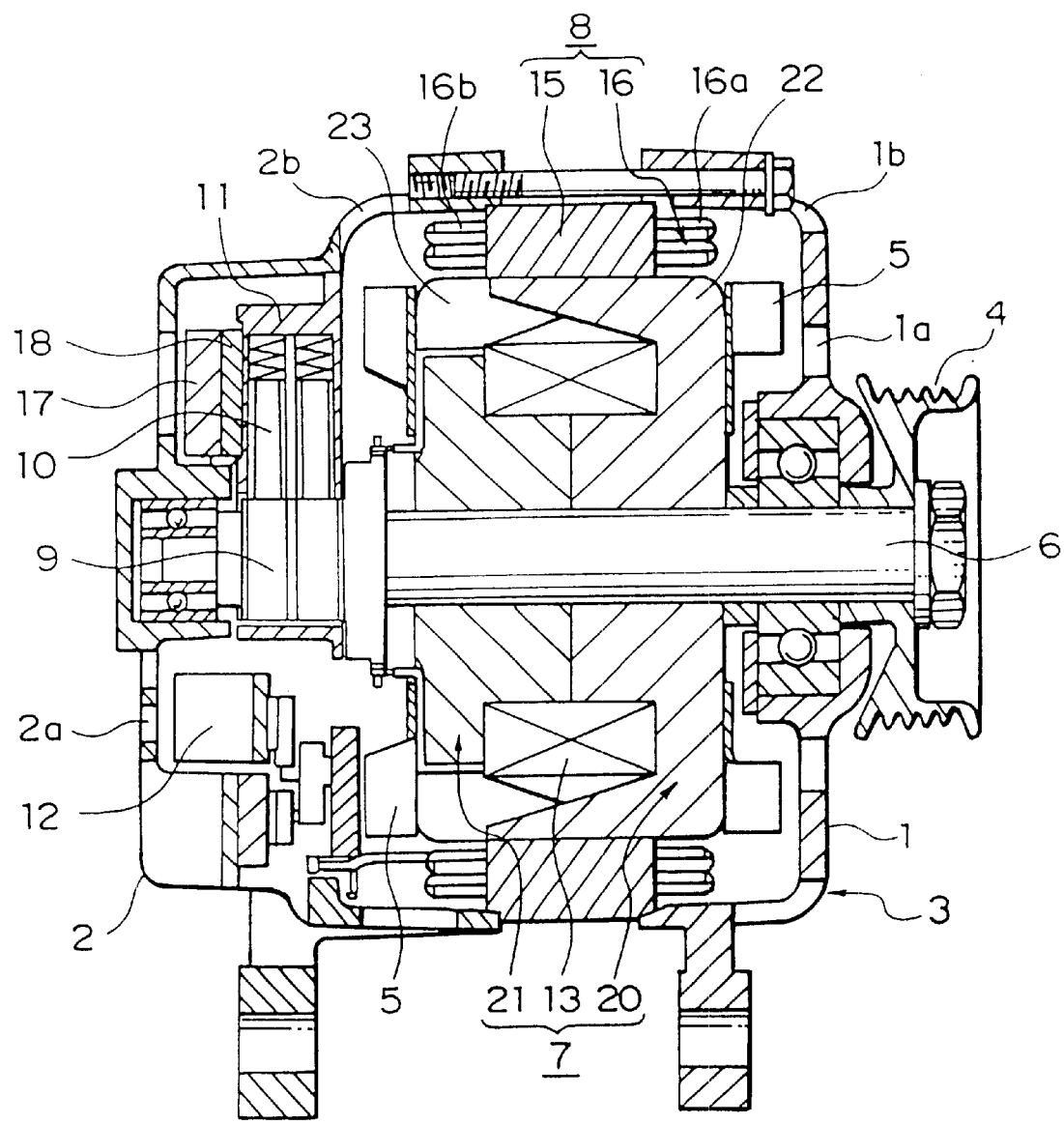
FIG. 1 is a cross section of an automotive alternator according to Embodiment 1 of the present invention.
Figure 2:
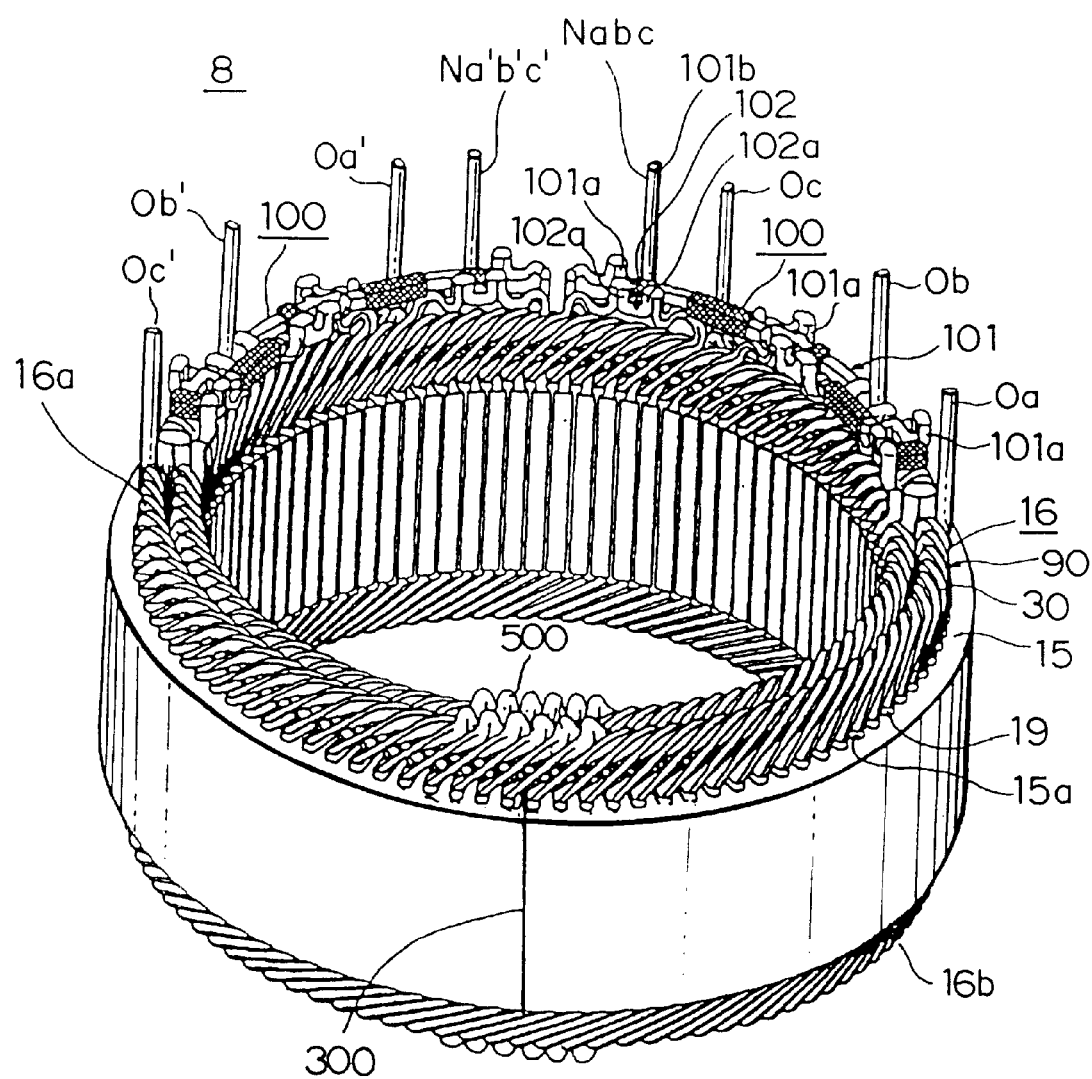
FIG. 2 is a perspective of a stator in FIG. 1.
Figure 3:
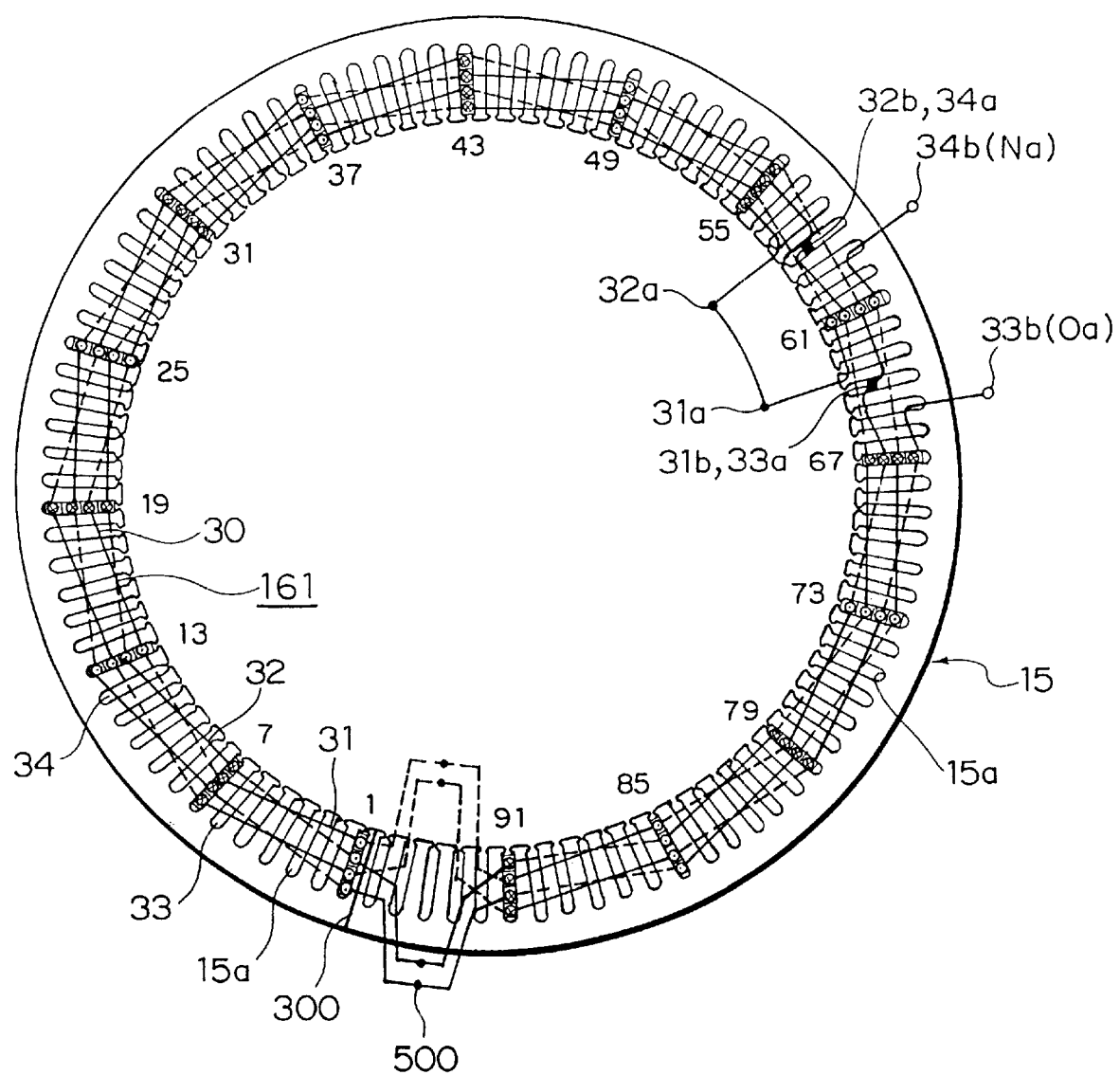
FIG. 3 is a diagram explaining connections in one phase of a stator winding in FIG. 1.
Figure 4:
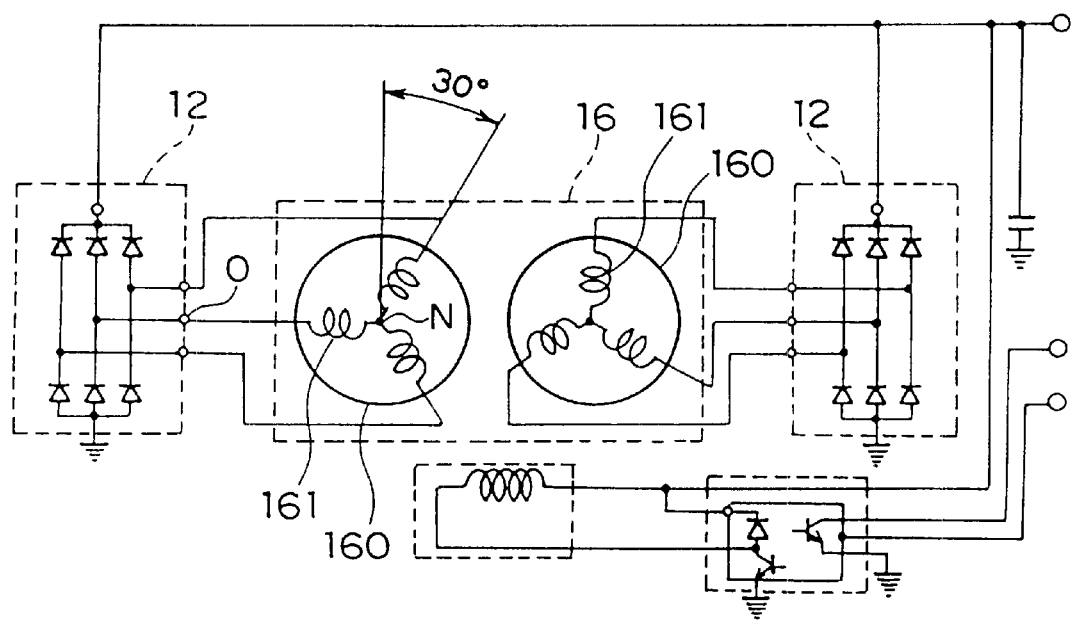
FIG. 4 is a circuit diagram for the automotive alternator in FIG. 1.

FIG. 1 is a cross section showing the construction of an automotive alternator according to Embodiment 1 of the present invention, FIG. 2 is a perspective showing a stator from the automotive alternator in FIG. 1, FIG. 3 is a diagram explaining connections in one phase of a stator winding in FIG. 1, and FIG. 4 is a circuit diagram for the automotive alternator in FIG. 1.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5 secured to both axial end surfaces of the rotor 7; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; rectifiers 12 electrically connected to the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 includes a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around outer circumferential edges, facing each other so as to intermesh.

The stator 8 includes: a cylindrical stator core 15 composed of a laminated core formed with a number of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator winding 16 includes two sets of winding assemblies 90 arranged in two rows. The winding assemblies 90 include a number of winding sub-portions in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart.

Moreover, in FIG. 2, Oa, Ob, and Oc represent output wires of the respective phases of a first three-phase alternating-current winding 160, Nabc represents a neutral-point lead wire of the first three-phase alternating-current winding 160, Oa', Ob', and Oc' represent output wires of the respective phases of a second three-phase alternating-current winding 160, Na'b'c' represents a neutral-point lead wire of the first three-phase alternating-current winding 160.

In this case, the stator core 15 is formed with ninety-six slots 15a at even pitch so as to house the two sets of three-phase alternating-current windings 160 such that the number of slots housing each phase of the alternating-current windings corresponds to the number of magnetic poles (sixteen) in the rotor 7. In other words, there are two slots per pole per phase. Long, insulated copper wire material having a rectangular cross section, for example, is used in the strands of wire 30.

Next, the winding construction of one phase of stator winding portion 161 will be explained in detail with reference to FIG. 3.

One phase of stator winding portion 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an inner circumferential side and a second position from the inner circumferential side inside the slots 15*a*. The second winding sub-portion 32 is formed by wave winding a strand of wire 30 into every sixth slot from slot numbers 1 to 91 so as to alternately occupy the second position from the inner circumferential side and the first position from the inner circumferential side inside the slots 15*a*. The third winding sub-portion 33 is formed by wave winding a strand of wire 30 into every sixth slot from slot numbers 1 to 91 so as to alternately occupy a third position from the inner circumferential side and a fourth position from the inner circumferential side inside the slots 15*a*. The fourth winding sub-portion 34 is formed by wave winding a strand of wire 30 into every sixth slot from slot numbers 1 to 91 so as to alternately occupy the fourth position from the inner circumferential side and the third position from the inner circumferential side inside the slots 15*a*.

Thus, the first to fourth winding sub-portions 31 to 34 each constitute one turn of winding formed by winding one strand of wire 30 into every sixth slot 15*a* so as to alternately occupy an inner layer and an outer layer in a slot depth direction. The strands of wire 30 are arranged to line up in a row of four strands within each slot 15*a* with the longitudinal direction of their rectangular cross sections aligned in a radial direction. Hereinafter, the positions of the strands of wire 30 within the slots 15*a* will be called the first, second, third, and fourth positions from the inner circumferential side.

Moreover, although not shown, a total of six phases of stator winding portions 161 are formed by offsetting the slots 15*a* into which the strands of wire 30 are wound by one slot each.

At a first end of the stator core 15, a bridging connection is formed between a second end portion 31*b* of the first winding sub-portion 31 extending outwards from the second position of slot number 67 and a first end portion 33*a* of the third winding sub-portion 33 extending outwards from the third position of slot number 61, and a bridging connection is formed between a second end portion 32*b* of the second winding sub-portion 32 extending outwards from the second position of slot number 61 and a first end portion 34*a* of the fourth winding sub-portion 34 extending outwards from the third position of slot number 55, and in addition, a bridging connection is formed between a first end portion 31*a* of the first winding sub-portion 31 extending outwards from the first position of slot number 61 and a first end portion 32*a* of the second winding sub-portion 32 extending outwards from the first position of slot number 55. Thus, the first to fourth winding sub-portions 31 to 34 are connected in series to form one phase of stator winding portion 161 having four turns, namely, the a-phase stator winding portion. Moreover, the bridging connections are formed by means of three-phase alternating-current connection terminals 100.

At this time, a second end portion 33*b* of the third winding sub-portion 33 extending outwards from the fourth position of slot number 67 and a second end portion 34*b* of the fourth winding sub-portion 34 extending outwards from the fourth position of slot number 61 become an output wire (Oa) and a neutral-point lead wire (Na), respectively, of the a-phase winding.

The b-phase winding portion, which has four turns, and the c-phase winding portion, which also has four turns, are formed in a similar manner to the a-phase stator winding portion.

Then, the stator winding 16, which is composed of two sets of three-phase alternating-current windings 160, is formed by connecting the winding portions wound onto the stator core 15 into alternating-current connections using the three-phase alternating-current connection terminals 100.

Each of the sets of three-phase alternating-current windings 160 is star-connected such that the phase difference between each of the phases of stator winding portions 161 therein is an electrical angle of 120°. Furthermore, the two sets of three-phase alternating-current windings 160 are wound onto the stator core 15 so as to have a phase difference of 30° from each other. Then, as shown in FIG. 4, each of the two sets of three-phase alternating-current windings 160 is connected to its own rectifier 12. The rectifiers 12 are connected in parallel so that the direct-current output from each is combined. Furthermore, the neutral points of each of the three-phase alternating-current windings 160 are connected to direct-current output terminals of the rectifiers by means of diodes.

Thus, each of the strands of wire 30 is wound so as to alternately occupy the inner layer and the outer layer relative to the slot depth direction (the radial direction) in every sixth slot, and the first winding sub-portion 31 and the second winding sub-portion 32 are offset by an electrical angle of 180° so as to be inversely wound relative to each other. Similarly, the third winding sub-portion 33 and the fourth winding sub-portion 34 are also offset by an electrical angle of 180° so as to be inversely wound relative to each other.

Turn portions 30*a* of the strands of wire 30 extend outwards from the stator core 15 and fold back to form coil ends. The turn portions 30*a* which are formed into substantially the same shape at both axial ends of the stator core 15 are mutually spaced circumferentially and radially, and arranged neatly in two rows circumferentially, to form coil end groups 16*a* and 16*b*.

Next, the assembly of the stator 8 will be explained with reference to FIGS. 5 to 13.

Figure 5:
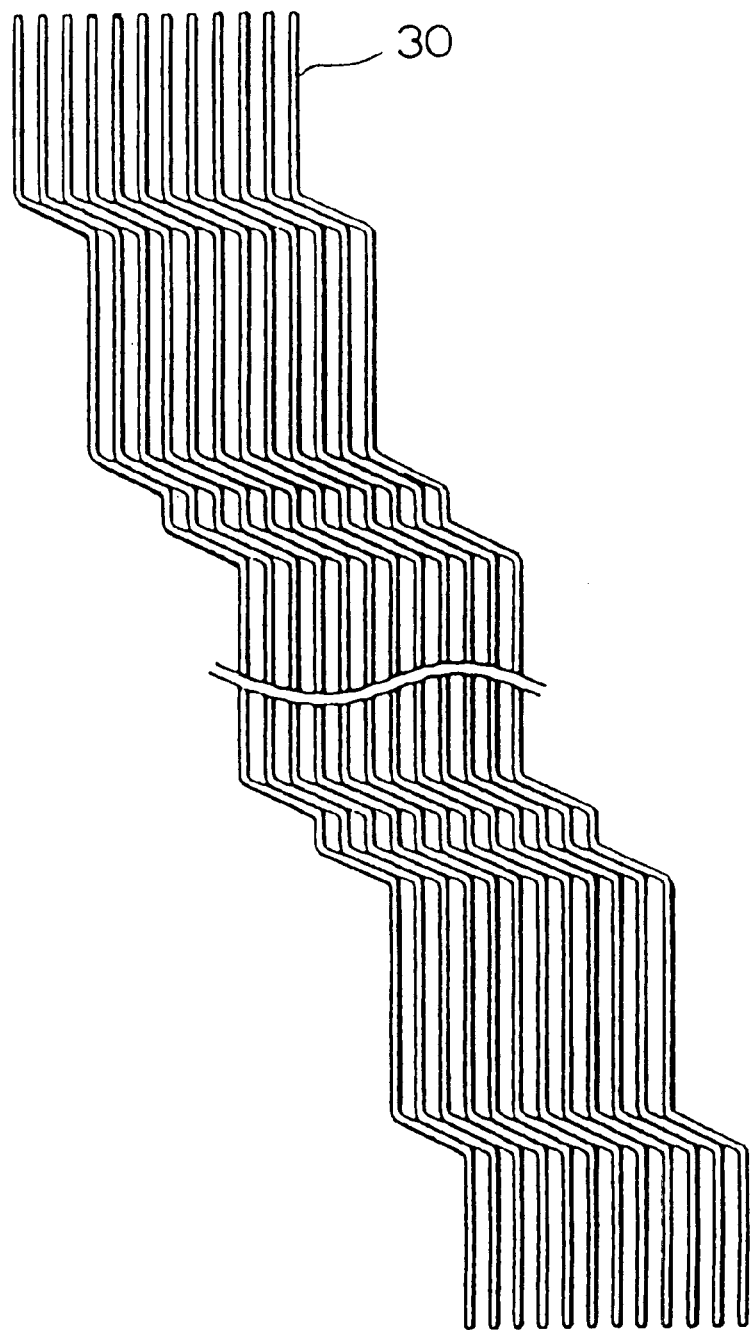
FIG. 5 is a diagram explaining the manufacturing process for a winding portion constituting part of the stator winding used in the automotive alternator in FIG. 1.
Figure 6:
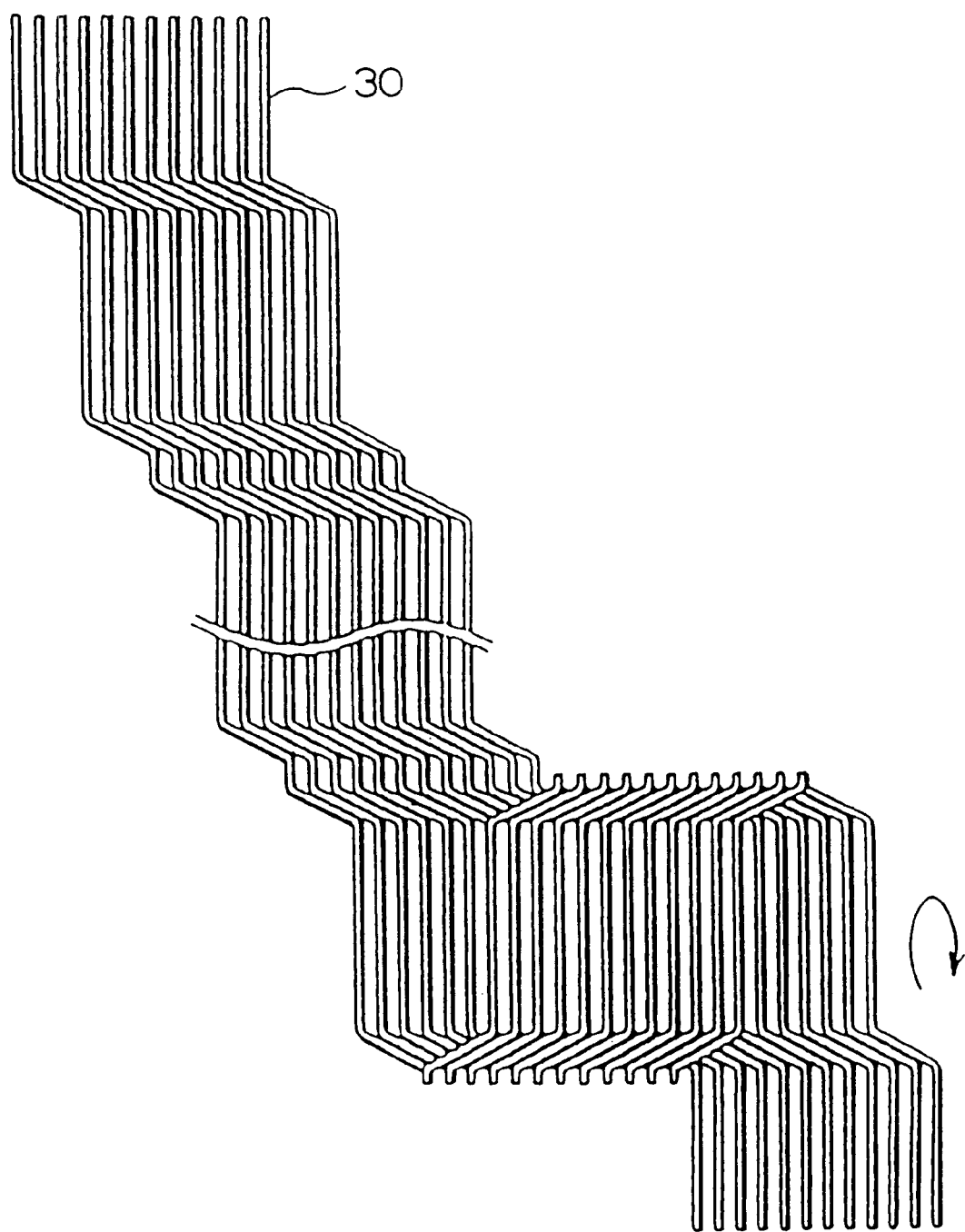
FIG. 6 is a diagram explaining the manufacturing process for a winding portion constituting part of the stator winding used in the automotive alternator in FIG. 1.
Figure 7:
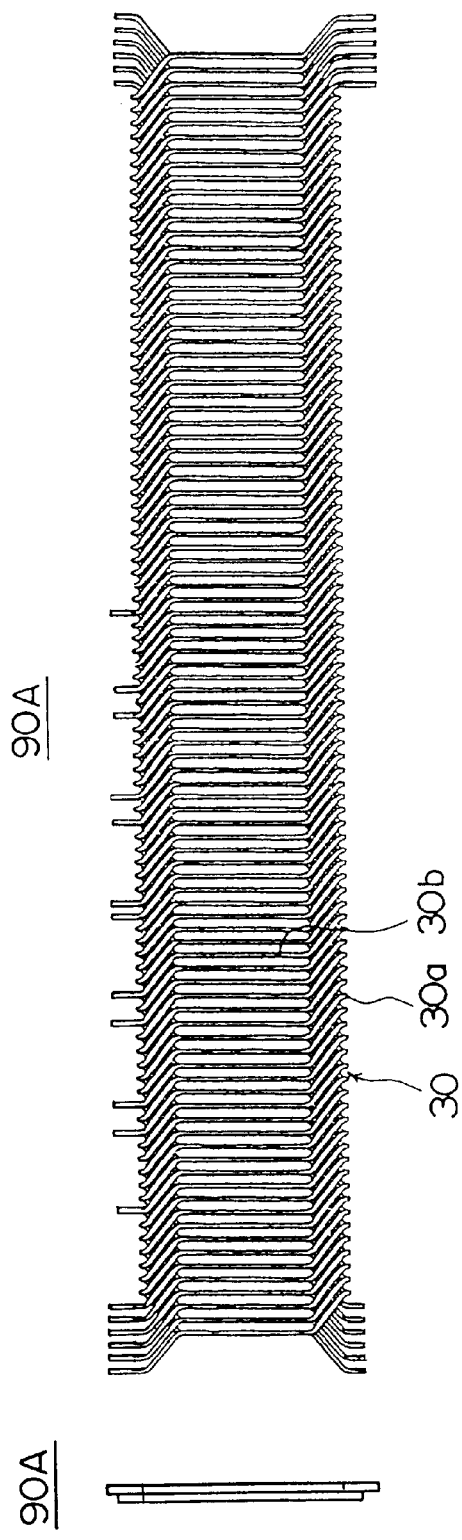
FIGS. 7(a) and 7(b) are an end elevation and a plan, respectively, showing an inner-layer winding assembly constituting part of the stator winding used in the automotive alternator in FIG. 1.
Figure 8:
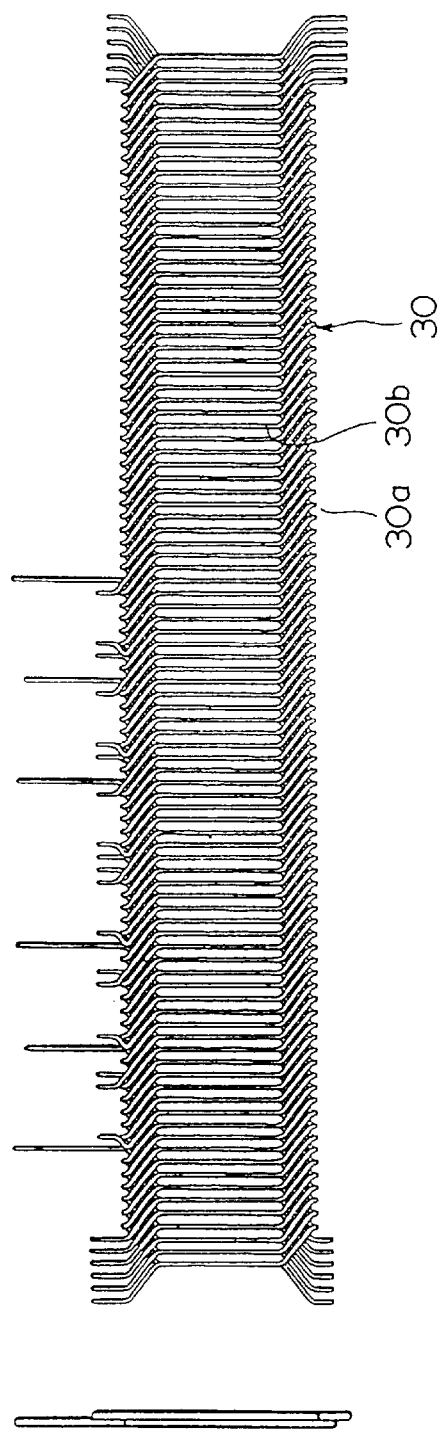
FIGS. 8(a) and 8(b) are an end elevation and a plan, respectively, showing an outer-layer winding assembly constituting part of the stator winding used in the automotive alternator in FIG. 1.

First, as shown in FIG. 5, twelve long strands of wire 30 are simultaneously bent in the same plane to form a lightning-bolt shape. Then, the winding assemblies 90A and 90B shown in FIGS. 7 and 8 are prepared by progressively folding the strands at right angles, as indicated by the arrow in FIG. 6, using a jig. In this folding process, specific strands of wire 30 are drawn out to form lead portions of the bridging connections, the output wires, and the neutral-point lead wires. In FIGS. 7 and 8, the numerous elements extending outwards from one side of the winding assemblies 90A and 90B correspond to the lead portions. Moreover, the constructions of the winding assemblies 90A and 90B are identical except for the lead portions of the bridging connections, the output wires, and the neutral-point lead wires.

Figure 9:
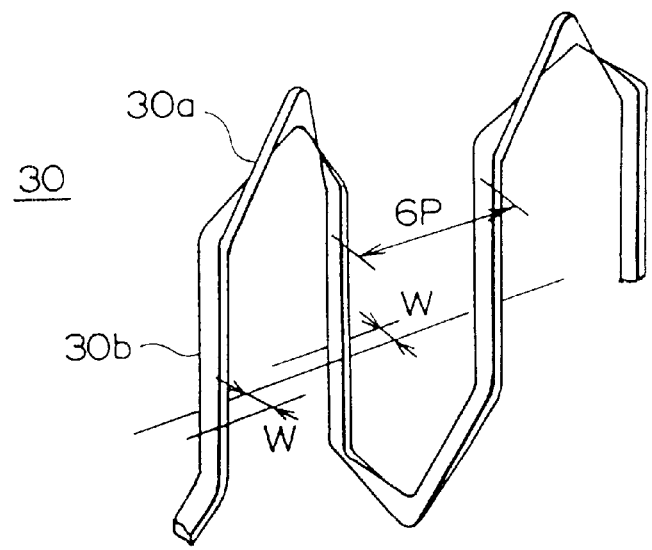
FIG. 9 is a perspective showing part of a strand of wire constituting part of the stator winding used in the automotive alternator in FIG. 1.
Figure 10:
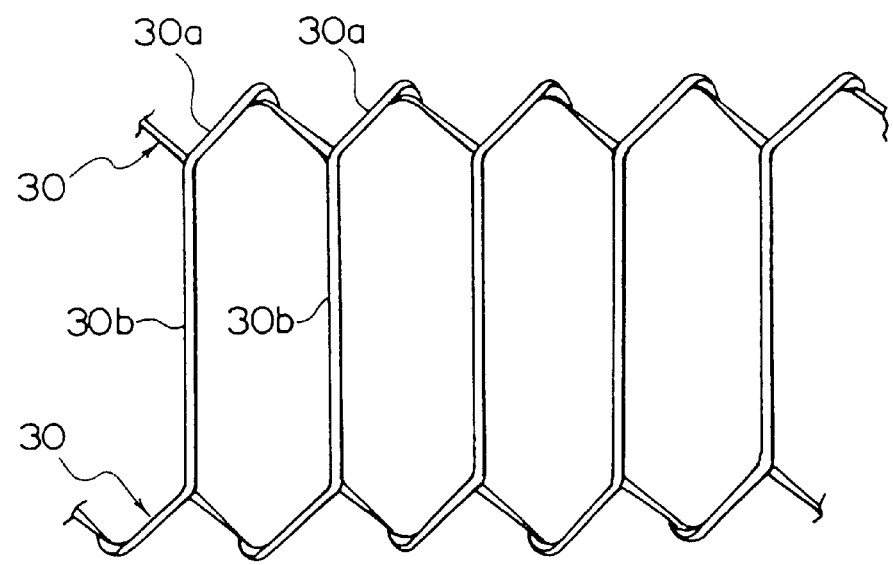
FIG. 10 is a diagram explaining arrangement of the strands of wire constituting part of the stator winding used in the automotive alternator in FIG. 1.

Moreover, as shown in FIG. 9, each strand of wire 30 is formed by bending it into a planar pattern in which straight portions 30*b* connected by turn portions 30*a* are lined up at a pitch of six slots (6P). Adjacent straight portions 30*b* are offset by a distance equal to one width (W) of the strands of wire 30 by means of the turn portions 30a. The winding assemblies 90A and 90B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 10. Six end portions of the strands of wire 30 each extend outwards from first and second sides at first and second ends of the winding assemblies 90A and 90B. Furthermore, the turn portions 30a are arranged so as to line up in rows on first and second side portions of the winding assemblies 90A and 90B. Moreover, as shown in FIG. 10, wire-strand pairs arranged so that straight portions 30b are offset at a pitch of six slots and stacked are offset by an electrical angle of 180°.

Figure 12A:
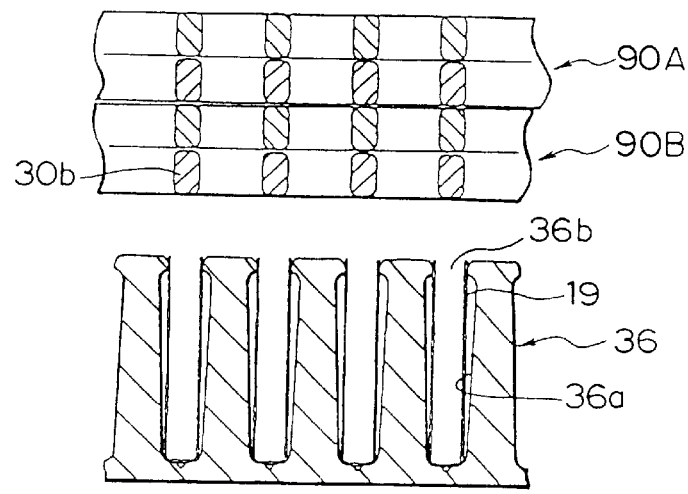
FIGS. 12(a) to 12(c) are cross sections explaining the manufacturing process for the stator in FIG. 1.
Figure 12B:
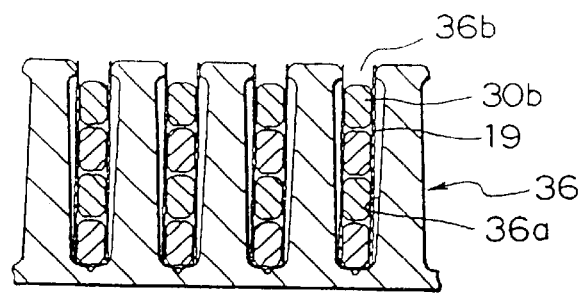

Meanwhile, the parallelepiped laminated body 36 is prepared as shown in FIGS. 11(a) and 11(b) by laminating a predetermined number of sheets of SPCC material formed with trapezoidal slots 36a at a predetermined pitch (an electrical angle of 30°) and laser welding an outer portion. As shown in FIG. 12(a), the insulators 19 are mounted in the slots 36a of the parallelepiped laminated body 36, and the straight portions of the two winding assemblies 90A and 90B are inserted so as to stack up within each of the slots. In this manner, the two winding assemblies 90A and 90B are installed in the parallelepiped laminated body 36 as shown in FIG. 12(b). At this time, straight portions 30b of the strands of wire 30 are housed in lines of four in a radial direction within the slots 36a and are electrically insulated from the parallelepiped laminated body 36 by the insulators 19. Next, the prepared winding assemblies 90A and 90B are annealed for ten minutes at 300° C. so that the parallelepiped laminated body 36 can be easily formed into an annular shape with the winding assemblies 90A and 90B installed as shown in FIG. 13(a).

Figure 12C:
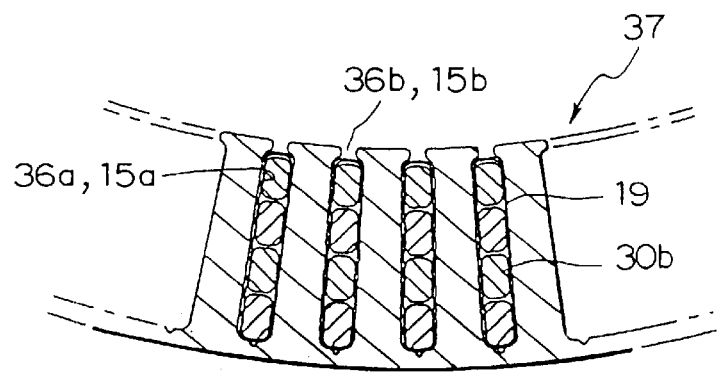

Next, the parallelepiped laminated body 36 is rolled up and core abutting portions 300 constituted by both end surfaces of the laminated body 36 are placed in contact, and the core abutting portions 300 are welded to each other to obtain a cylindrical core 15. As shown in FIG. 12(c), by rolling up the parallelepiped laminated body 36, the slots 36a (corresponding to the slots 15a in the stator core 15) take on a generally rectangular cross-sectional shape, and opening portions 36b of the slots 36a become smaller than the slot-width dimensions of the straight portions 30b.

Figure 13A:
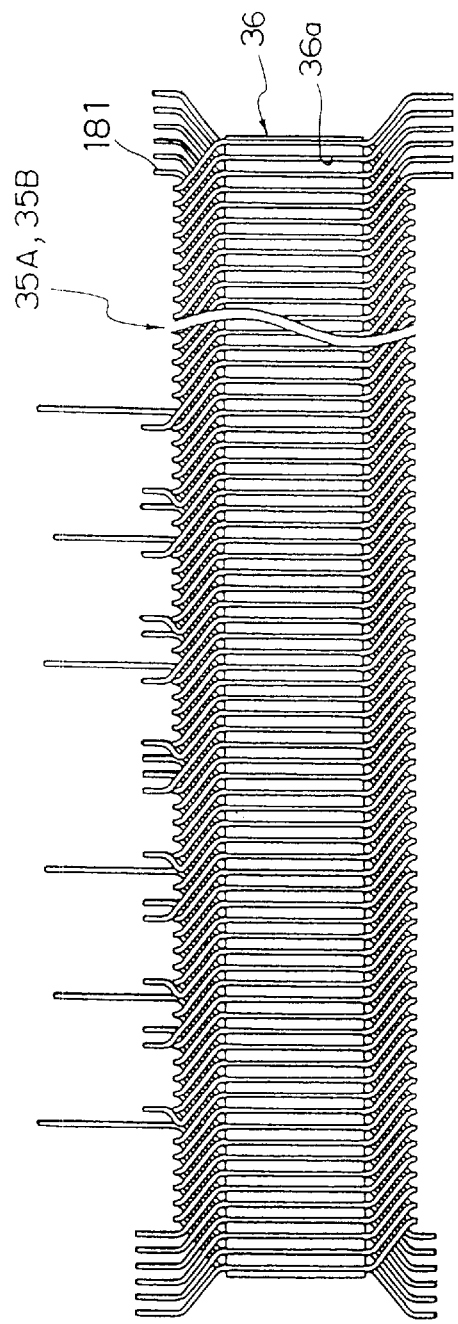
FIGS. 13(a) and 13(b) are plans showing a winding assembly constituting part of the stator winding used in this automotive alternator mounted into the core.
Figure 13B:
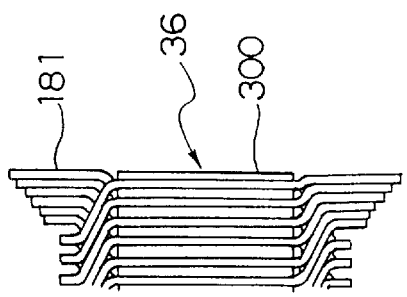

Moreover, because output wires 181 for connecting each of the winding sub-portions 31 to 34 are shaped so as not to cross the planes of the core abutting portions 300 before the laminated body 36 is rolled up, as shown in FIG. 13(b), and the output wires 181 are reshaped as shown in FIG. 13(a) after the laminated body 36 is formed into the cylindrical shape, damage to the insulation coating due to contact between the output wires 181 as the laminated body 36 is being formed into the cylindrical shape, for example, is prevented.

Figure 14:
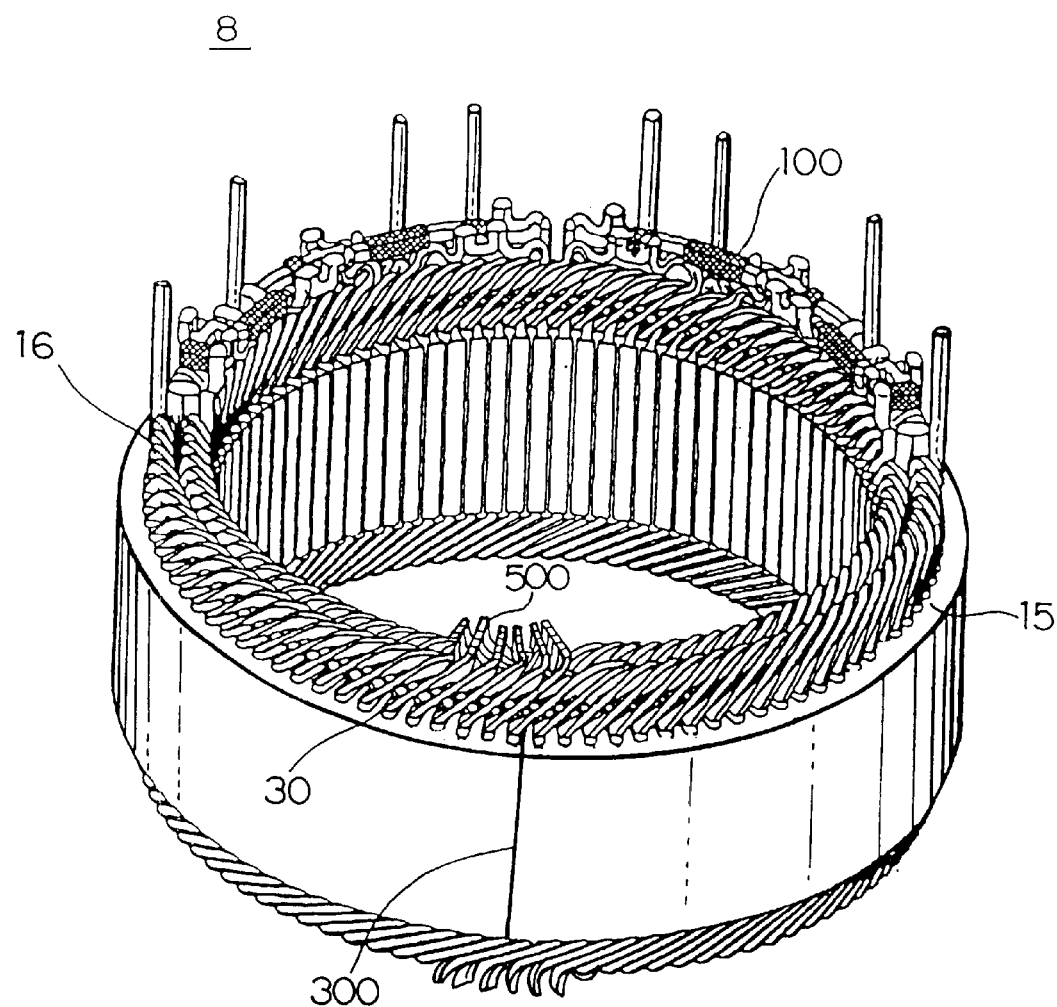
FIG. 14 is a perspective of the stator in FIG. 1 before connection.

Thereafter, as shown in FIG. 14, the first to fourth winding sub-portions 31 to 34 which are wound into the same slot groups are joined and electrically connected by welding at a winding connection portion 500, and each constitutes a winding sub-portion having one turn.

Next, as explained previously, the stator winding 16, which is composed of two sets of three-phase alternating-current windings 160, is formed by connecting the winding portions wound onto the stator core 15 into alternating-current connections using the three-phase alternating-current connection terminals 100.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 16, generating electromotive force in the stator winding 16. This alternating electromotive force passes through the rectifiers 12 and is converted into direct current, the magnitude of the current is adjusted by the regulator 18, and the battery is recharged.

At the rear end, external air is drawn in through air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the stator winding 16 before being expelled to the outside through the air discharge vents 2b. At the same time, at the front end, external air is drawn in axially through air intake vents 1a by rotation of the fans 5, and is then deflected centrifugally by the fans 5, cooling the front-end coil end group 16a of the stator winding 16 before being expelled to the outside through the air discharge vents 1b.

In the alternator of the above construction, because the stator core 15 is provided with the core abutting portions 300 extending axially such that the annular shape is formed by abutting both end surfaces of the parallelepiped laminated body 36, and the stator winding 16 is provided with the winding connection portion 500, which is axially aligned with the core abutting portions 300, the stator winding 16 is completely installed in the slots 36a of the laminated body 36 (which are also the slots 15a of the stator core 15) before the end surfaces of the laminated body 36 are abutted, eliminating the need for troublesome operations such as inserting portions of the stator winding 16 into the slots 15a after bending and forming the stator core 15.

Furthermore, the stator winding 16 can be installed in all of the slots 15a of the stator core 15 when the opening portions of the slots 15a are widened, enabling the space factor of the strands of wire 30 in the cylindrical stator core to be increased in proportion to the difference in the width of the opening portions of the slots 15a compared to when the stator winding is installed in the slots after forming the cylindrical shape.

Because the stator winding 16 is formed with the two winding assemblies 90A and 90B being stacked radially in the stator core 15 and each phase of the stator winding portions 161 having four turns is formed by connecting the winding sub-portions in series, the first to fourth winding sub-portions 31 to 34 are arranged in rows at the winding connection portion 500, facilitating connection, and each phase is lined up in two positions radially and these are lined up in six positions circumferentially. Similarly, each phase is also lined up in two positions radially at the front bracket end and these are lined up in six positions circumferentially. The stator 8 can be manufactured by installing the winding assemblies 90A and 90B into the stator core 15 in order, simplifying the manufacturing of the stator 8.

Furthermore, as shown in FIG. 14, because the end portions of the winding sub-portions in the winding connection portion 500 extend axially before connection, connection is facilitated. Connection of the strands of wire 30 consists of welding joints and the strands of wire 30 are reliably joined to each other at the connection portions, improving the reliability of the connection portions.

Embodiment 2

Figure 15:
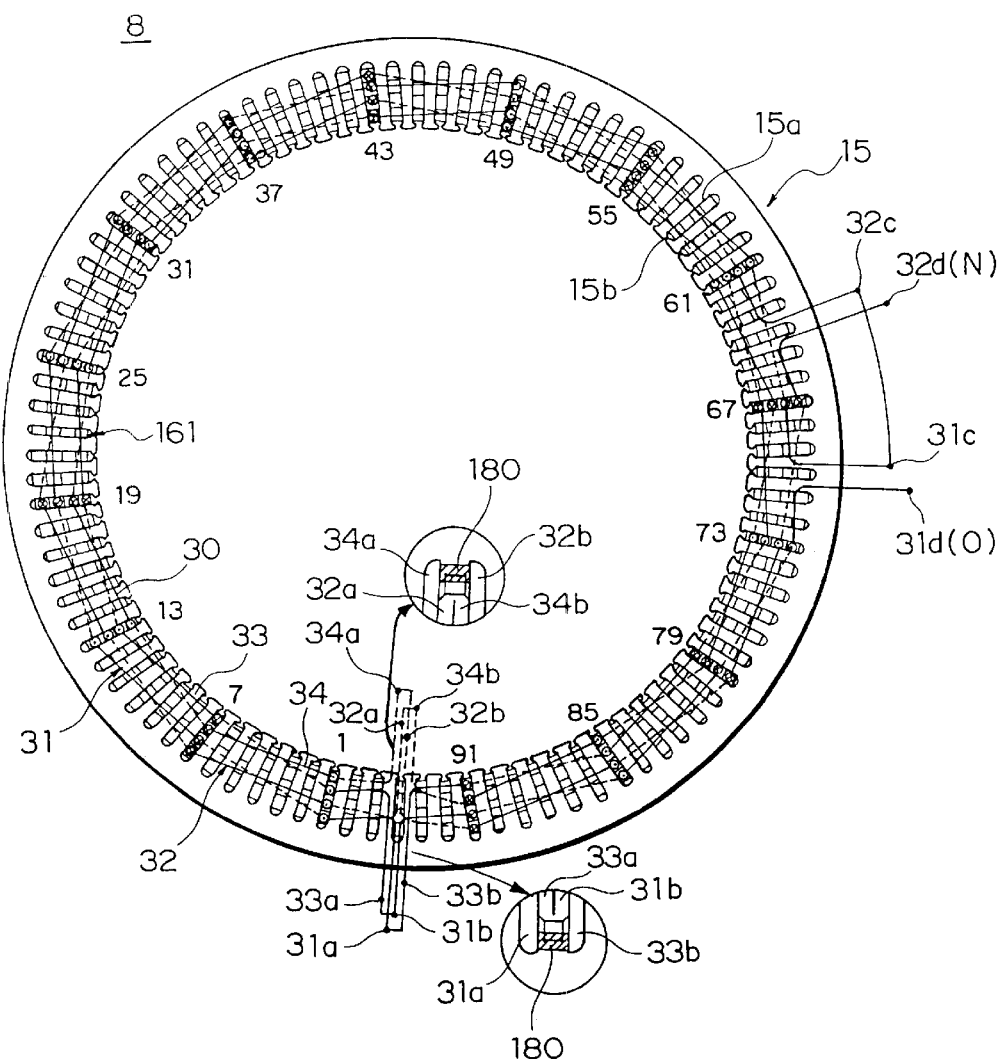
FIG. 15 is a diagram explaining connections in one phase of a stator winding according to Embodiment 2 of the present invention.

FIG. 15 is a diagram explaining connections in one phase of a stator winding portion 161 in an alternator according to Embodiment 2 of the present invention.

In one phase of stator winding portion 161, at a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form a winding having two turns.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form a winding having two turns.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of stator winding group 161 having four turns connecting the first to fourth winding sub-portions 31 to 34 in series.

In Embodiment 2, the winding connection portion 500 is axially aligned with the core abutting portions 300 of the stator core 15, and in the winding connection portion 500 at the first end of the stator core 15, the first end portion 31a of the first winding sub-portion 31 is in the fourth position from the inner circumferential side, the second end portion 33b of the third winding sub-portion 33 which is joined to this first end portion 31a is in the first position from the inner circumferential side, the first end portion 33a of the third winding sub-portion 33 is in the second position from the inner circumferential side, the second end portion 31b of the first winding sub-portion 31 which is joined to this first end portion 33a is in the third position from the inner circumferential side, and the end portions 32a and 34b are formed so as to straddle the end portions 34a and 32b, simplifying the joining of each.

In the winding connection portion 500 at the second end of the stator core 15, the first end portion 32a of the second winding sub-portion 32 is in the third position from the inner circumferential side, the second end portion 34b of the fourth winding sub-portion 34 which is joined to this first end portion 32a is in the second position from the inner circumferential side, the first end portion 34a of the fourth winding sub-portion 34 is in the first position from the inner circumferential side, the second end portion 32b of the second winding sub-portion 32 which is joined to this first end portion 34a, and the end portions 32a and 34b are formed so as to straddle the end portions 34a and 32b, simplifying the joining of each.

In this embodiment, as shown in FIG. 15, metal terminals 180 are interposed between the end portions of each of the winding sub-portions, enabling the end portions of each of the winding sub-portions to be electrically connected by welding without deformation, enabling a four-turn winding construction to be easily achieved.

Embodiment 3

Figure 16:
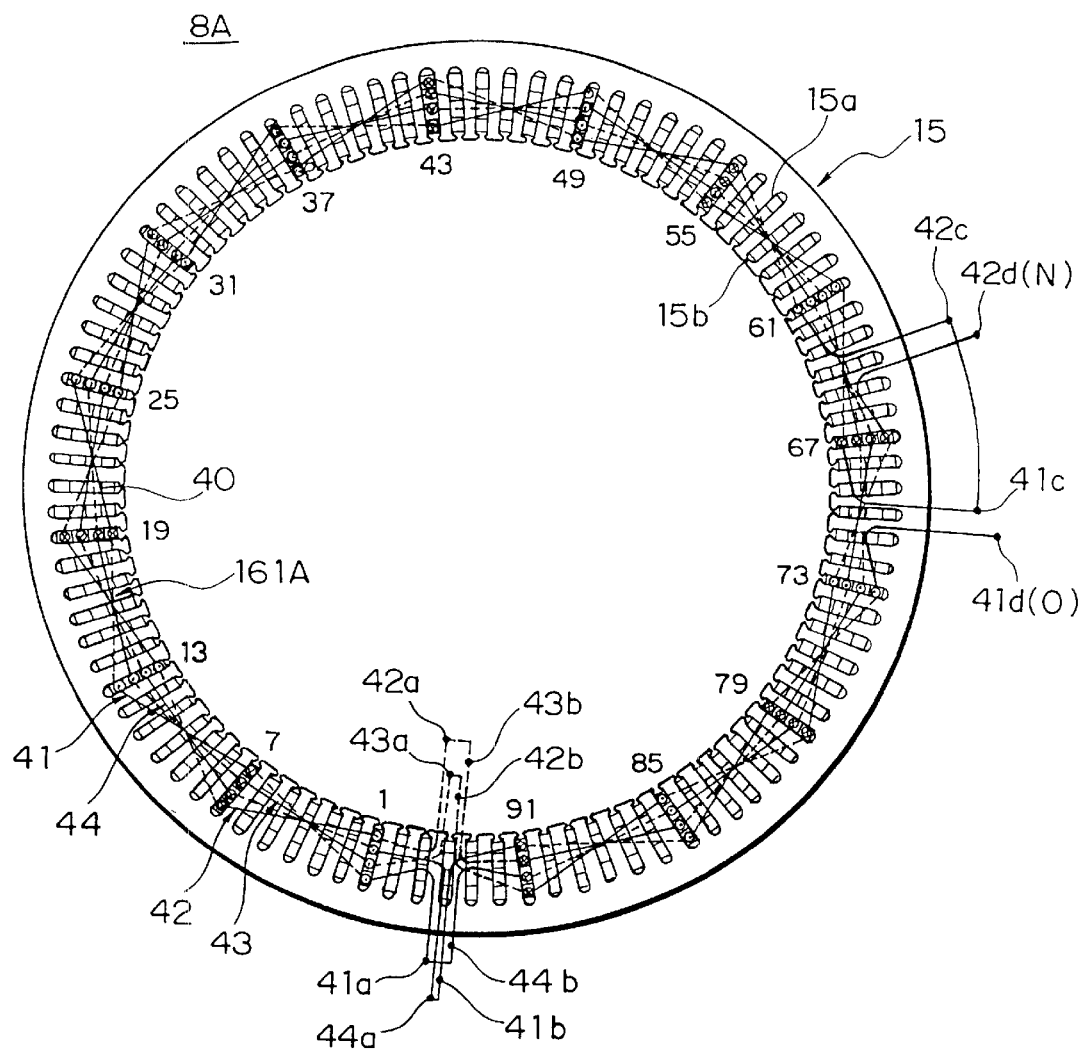
FIG. 16 is a diagram explaining connections in one phase of a stator winding according to Embodiment 3 of the present invention.

FIG. 16 is a diagram explaining connections in one phase of a stator winding in an automotive alternator according to Embodiment 3 of the present invention.

In one phase of this stator winding portion 161A, the first winding sub-portion 41 is formed by wave winding one strand of wire 40 into every sixth slot from slot numbers 1 to 91 so as to alternately occupy a first position from an outer circumferential side and a fourth position from the outer circumferential side inside the slots 15a. The second winding sub-portion 42 is formed by wave winding a strand of wire 40 into every sixth slot from slot numbers 1 to 91 so as to alternately occupy the fourth position from the outer circumferential side and the first position from the outer circumferential side inside the slots 15a. The third winding sub-portion 43 is formed by wave winding a strand of wire 40 into every sixth slot from slot numbers 1 to 91 so as to alternately occupy a second position from the outer circumferential side and a third position from the outer circumferential side inside the slots 15a. The fourth winding sub-portion 42 is formed by wave winding a strand of wire 40 into every sixth slot from slot numbers 1 to 91 so as to alternately occupy the third position from the outer circumferential side and the second position from the outer circumferential side inside the slots 15a. The strands of wire 40 are arranged to line up in a row of four strands within each slot 15a with the longitudinal direction of their rectangular cross sections aligned in a radial direction.

At the first end of the stator core 15, a first end portion 41a of the first winding sub-portion 41 extending outwards from slot number 1 and a second end portion 44b of the fourth winding sub-portion 44 extending outwards from slot number 91 are joined, and in addition, a first end portion 44a of the fourth winding sub-portion 44 extending outwards from slot number 1 and a second end portion 41b of the first winding sub-portion 41 extending outwards from slot number 91 are joined to form two turns of winding.

At the second end of the stator core 15, a first end portion 42a of the second winding sub-portion 42 extending outwards from slot number 1 and a second end portion 43b of the third winding sub-portion 43 extending outwards from slot number 91 are joined, and in addition, a first end portion 43a of the third winding sub-portion 43 extending outwards from slot number 1 and a second end portion 42b of the second winding sub-portion 42 extending outwards from slot number 91 are joined to form two turns of winding.

In addition, a portion of the strand of wire 40 of the second winding sub-portion 42 extending outwards at the first end of the stator core 15 from slot numbers 61 and 67 is cut, and a portion of the strand of wire 40 of the first winding sub-portion 41 extending outwards at the first end of the stator core 15 from slot numbers 67 and 73 is also cut. A first cut end 41c of the first winding sub-portion 41 and a first cut end 42c of the second winding sub-portion 42 are joined to form one phase of stator winding group 161A having four turns connecting the first to fourth winding sub-portions 41 to 44 in series.

Moreover, the joint portion between the first cut end 41c of the first winding sub-portion 41 and the first cut end 42c of the second winding sub-portion 42 becomes a bridging connection connecting portion, a second cut end 41*d* of the first winding sub-portion 41 and a second cut end 42*d* of the second winding sub-portion 42 become an output wire (O) and a neutral-point lead wire (N), respectively.

A total of six phases of stator winding groups 161A are similarly formed by offsetting the slots 15*a* into which the strands of wire 40 are wound one slot at a time.

Next, the assembly of a stator 8A will be explained with reference to FIGS. 17 to 21.

Figure 17:
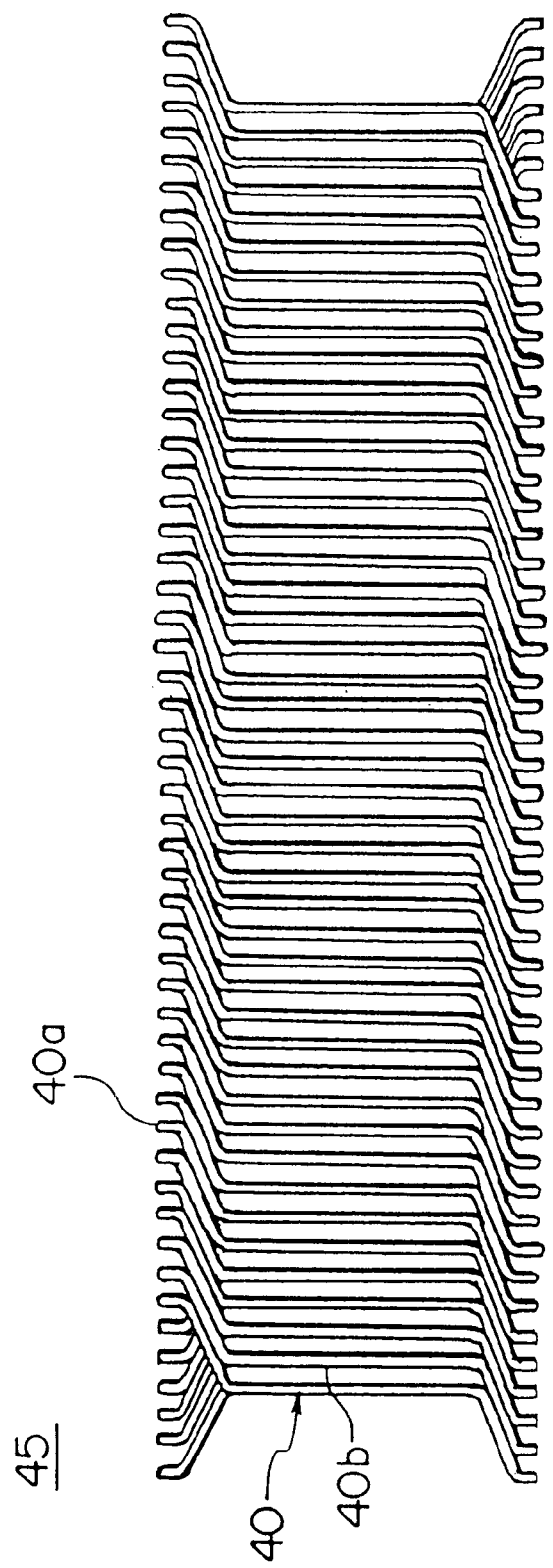
FIG. 17 is a plan of a small winding assembly constituting part of the stator winding in FIG. 16.
Figure 18:
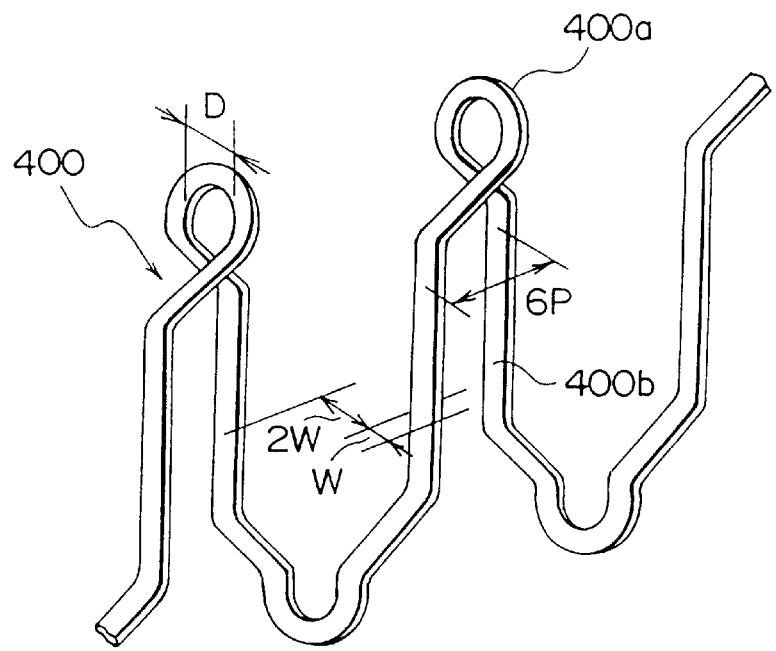
FIG. 18 is a perspective explaining the shape of a strand of wire constituting part of the small winding assembly in FIG. 17.

First, a small wire-strand portion 45 is formed by bending twelve long strands of wire 40 as shown in FIG. 17. As shown in FIG. 18, each strand of wire 40 is formed by bending it into a planar pattern in which straight portions 40*b* connected by turn portions 40*a* are lined up at a pitch of six slots (6P). Adjacent straight portions 40*b* are offset by a distance equal to one width (W) of the strands of wire 40 by means of the turn portions 40*a*.

Figure 19:
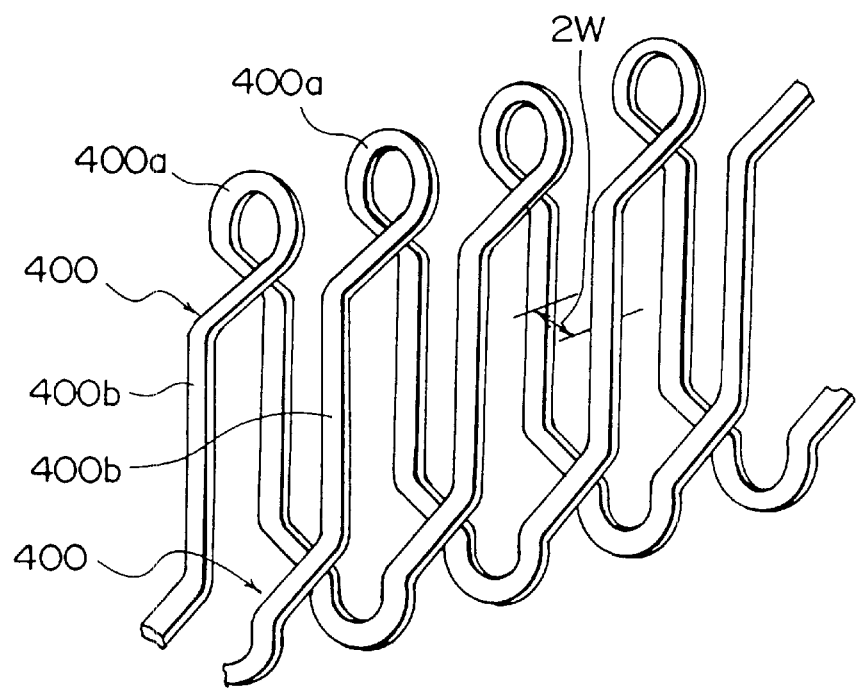
FIG. 19 is a perspective explaining arrangement of the strands of wire in the small winding assembly in FIG. 17.

The small wire-strand portion 45 is constructed by arranging six small wire-strand pairs so as to be offset by a pitch of one slot from each other, each small wire-strand pair consisting of two strands of wire 40 formed in the above pattern which are offset by a pitch of six slots and arranged such that straight portions 40*b* overlap as shown in FIG. 19. Six end portions of the strands of wire 40 each extend outwards from a first and a second side at a first and a second end of the small wire-strand portion 45. Furthermore, the turn portions 40*a* are arranged so as to line up in rows on first and second side portions of the small wire-strand portion 45.

Figure 20:
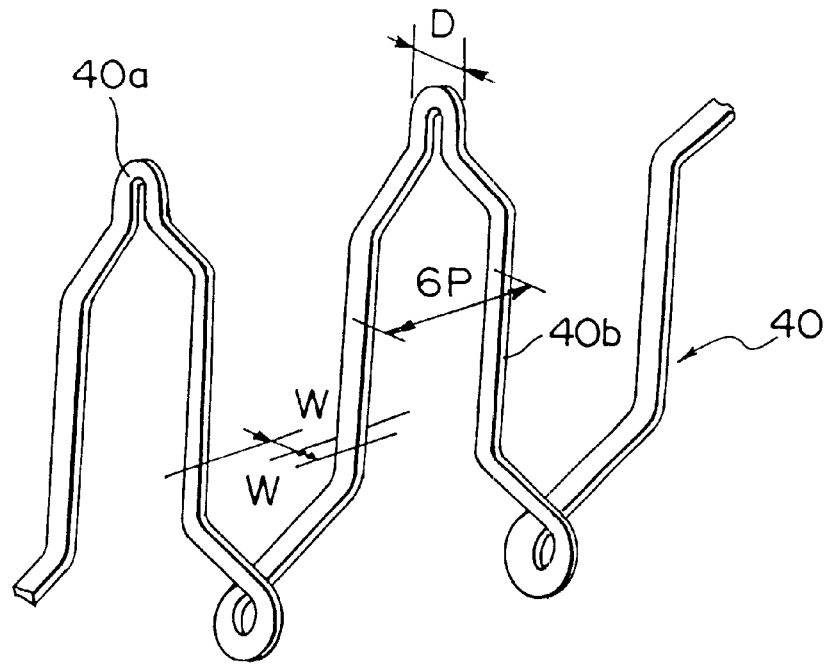
FIG. 20 is a perspective explaining the shape of a strand of wire constituting part of a large winding assembly constituting part of the stator winding according to Embodiment 3 of the present invention.

Next, although not shown, a large wire-strand portion is formed by bending twelve long strands of wire 400. As shown in FIG. 20, each strand of wire 400 is formed by bending it into a planar pattern in which straight portions 400*b* connected by turn portions 400*a* are lined up at a pitch of six slots (6P). Adjacent straight portions 400*b* are offset by substantially twice the width (2W) of the strands of wire 400 by means of the turn portions 400*a*. Furthermore, the inside diameter of the turn portions 400*a* of the strands of wire 400 constituting the large wire-strand portion is formed to be generally equal to the outside diameter (D) of the turn portions 40*a* of the strands of wire 40 constituting the small wire-strand portion 45.

Figure 21:
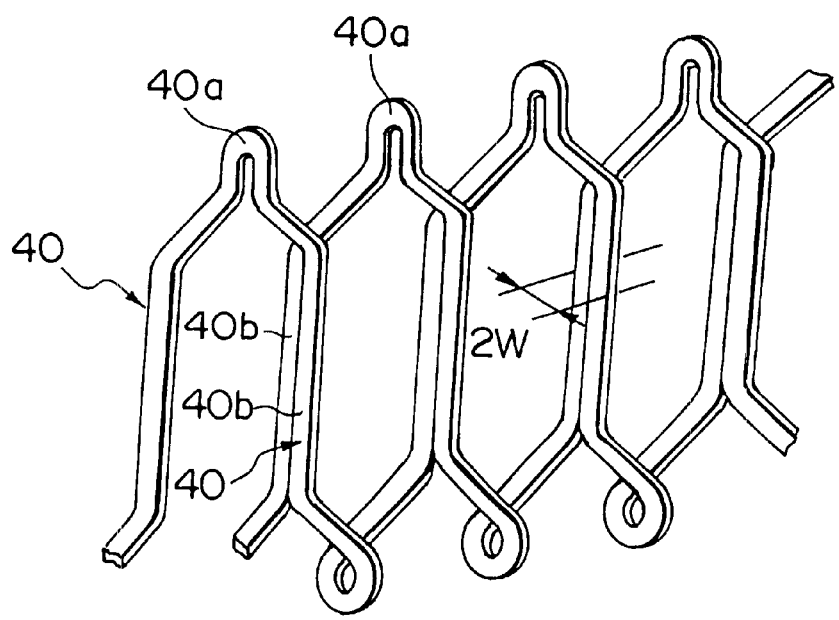
FIG. 21 is a perspective explaining arrangement of the strands of wire constituting part of the large winding assembly constituting part of the stator winding according to Embodiment 3 of the present invention.

The large wire-strand portion is constructed by arranging six large wire-strand pairs so as to be offset by a pitch of one slot from each other, each large wire-strand pair consisting of two strands of wire 400 formed in the above pattern which are offset by a pitch of six slots and arranged such that straight portions 400*b* overlap as shown in FIG. 21. Six end portions of the strands of wire 400 each extend outwards from a first and a second side at a first and a second end of the large wire-strand portion. Furthermore, the turn portions 400*a* are arranged so as to line up in rows on first and second side portions of the large wire-strand portion.

Moreover, the strands of wire 400 in the large wire-strand portion are identical to the strands of wire 40 in the small wire-strand portion 45. Except for differences in the diameter of the turn portions and the amount of offset of the straight portions 400*b*, the large wire-strand portion have the same construction as the small wire-strand portion 45.

Figure 22:
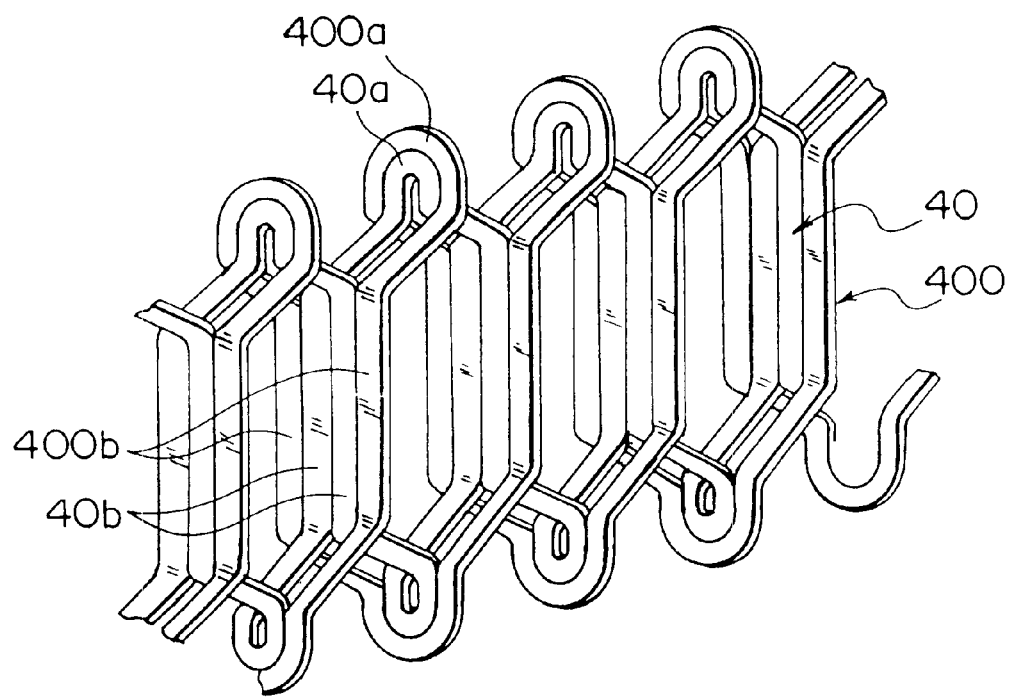
FIG. 22 is a perspective explaining arrangement of the strands of wire in the stator winding used in the automotive alternator according to Embodiment 3 of the present invention.

Next, the small wire-strand portion 45 constructed in this manner is inserted inside the large wire-strand portion to obtain a double wire-strand portion. At this time, the turn portions 400*a* of the large wire-strand portion are positioned within the double wire-strand portion so as to surround the turn portions 40*b* of the small wire-strand portion 45, and the straight portions 400*b* of the large wire-strand portion are positioned on both sides of the straight portions 40*b* of the small wire-strand portion as shown in FIG. 22.

Since the subsequent process is the same as in Embodiments 1 and 2, explanation thereof will be omitted.

In the stator 8A constructed in this manner, the strands of wire 40 and 400 constituting the first to fourth winding sub-portions 41 to 44 are each wound into a wave winding so as to extend out of first slots 15*a* at end surfaces of the stator core 15, fold back, and enter second slots 15*a* six slots away. Then, the turn portions 40*a* and 400*a* of the strands of wire 40 and 400 extend outwards from the stator core 15 and fold back to form coil ends. The turn portions 40*a* and 400*a* which are formed such that the turn portions 400*a* of the large wire-strand group surround the turn portions 40*b* of the small wire-strand group 45 are arranged neatly in two rows circumferentially, to form coil-end groups 16*a* and 16*b*.

Furthermore, according to Embodiment 3, because the turn portions 40*a* and 400*a* are stacked in two layers and arranged in rows circumferentially, coil-end height is raised by the width of one strand of wire, but the spacing between the turn portions 40*a* and 400*a* is increased in the circumferential direction, preventing short-circuiting accidents between the strands of wire.

Furthermore, increases in the number of turns in the polyphase stator winding can be easily adapted for by winding wire-strand portions composed of continuous wire so as to stack up on top of each other in the height direction.

In Embodiment 3, the winding connection portion 500 is axially aligned with the core abutting portions 300 of the stator core 15, and in the winding connection portion 500 at the first end of the stator core 15, the first end portion 41*a* of the first winding sub-portion 41 is in the fourth position from the inner circumferential side, the second end portion 44*b* of the fourth winding sub-portion 44 which is joined to this first end portion 41*a* is in the third position from the inner circumferential side, the first end portion 44*a* of the fourth winding sub-portion 44 is in the second position from the inner circumferential side, the second end portion 41*b* of the first winding sub-portion 41 which is joined to this first end portion 44*a* is in the first position from the inner circumferential side, the second end portion 41*b* of the first winding sub-portion 41 in the first position from the inner circumferential side being electrically connected to the first end portion 44*a* of the fourth winding sub-portion 44 in the second position from the inner circumferential side and the second end portion 44*b* of the fourth winding sub-portion 44 in the third position from the inner circumferential side being electrically connected to the first end portion 41*a* of the first winding sub-portion 41 in the fourth position from the inner circumferential side in the winding connection portion 500. In other words, end portions 44*a*, 41*b*, 41*a*, and 44*b* of adjacent winding sub-portions 41 and 44 are electrically connected, and the connection is easy to make. Furthermore, the axial length of the end portions 44*a*, 41*b*, 41*a*, and 44*b* can be kept short.

In the winding connection portion 500 at the second end of the stator core 15 also, first end portion 42*a* of the second winding sub-portion 42 in the first position from the inner circumferential side is electrically connected to the second end portion 43*b* of the third winding sub-portion 43 in the second position from the inner circumferential side, and the first end portion 43*a* of the third winding sub-portion 43 in the third position from the inner circumferential side is electrically connected to the second end portion 42*b* of the second winding sub-portion 42 in the fourth position from the inner circumferential side. In other words, end portions 42*a*, 43*b*, 43*a*, and 42*b* of adjacent winding sub-portions 42 and 43 are electrically connected, and the connection is easy to make. Furthermore, the axial length of the end portions 42*a*, 43*b*, 43*a*, and 42*b* can be kept short.

Embodiment 4

Figure 23:
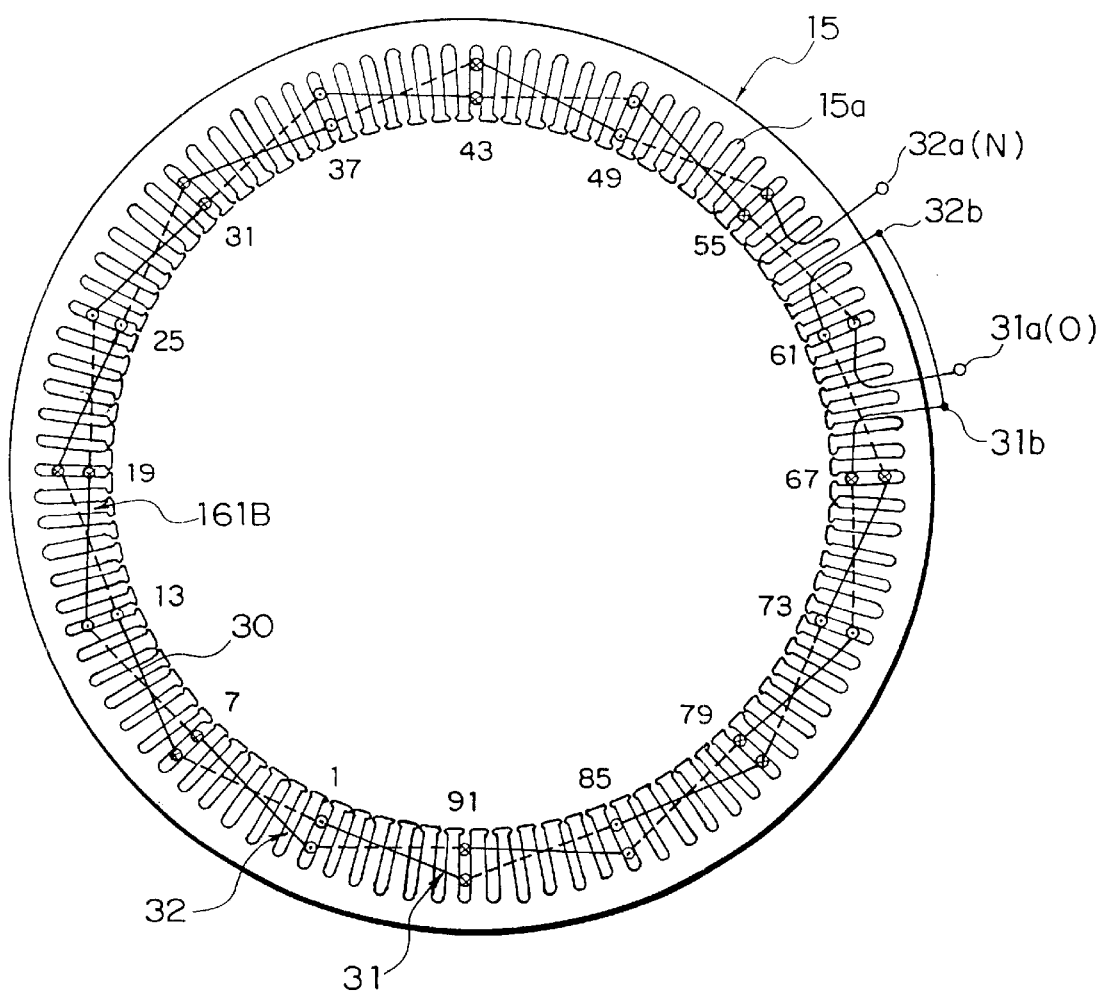
FIG. 23 is a diagram explaining connections in one phase of a stator winding according to Embodiment 4 of the present invention.

FIG. 23 is a diagram explaining connections in one phase of a stator winding in an automotive alternator according to Embodiment 4 of the present invention.

As in each of the above embodiments, in the automotive alternator according to Embodiment 4, the stator core 15 is also provided with the core abutting portions 300 extending axially such that the annular shape is formed by abutting both end surfaces of the parallelepiped laminated body 36, and the stator winding 16 is provided with the winding connection portion 500, which is axially aligned with the core abutting portions 300.

One phase of this stator winding portion 161B is composed of first and second winding sub-portions 31 and 32 each formed from one strand of wire 30. The first winding sub-portion 31 is formed by wave winding one strand of wire 30 into every sixth slot from slot numbers 1 to 91 so as to alternately occupy a first position from an inner circumferential side and a second position from the inner circumferential side inside the slots 15a. The second winding sub-portion 32 is formed by wave winding a strand of wire 30 into every sixth slot from slot numbers 1 to 91 so as to alternately occupy the second position from the inner circumferential side and the first position from the inner circumferential side inside the slots 15a.

Thus, the first and second winding sub-portions 31 and 32 each constitute one turn of winding formed by winding one strand of wire 30 into every sixth slot 15a so as to alternately occupy an inner layer and an outer layer in a slot depth direction.

At the first end of the stator core 15, a bridging connection is formed between a second end portion 31b of the first winding sub-portion 31 extending outwards from the second position from the outer circumferential side of slot number 67 and a second end portion 32b of the second winding sub-portion 32 extending outwards from the second position from the outer circumferential side of slot number 61. Thus, the first and second winding sub-portions 31 and 32 are connected in series to form one phase of stator winding portion 161B having two turns.

At this time, a first end portion 31a of the first winding sub-portion 31 extending outwards from the first position from an outer circumferential side of slot number 61 and a first end portion 32a of the second winding sub-portion 32 extending outwards from the first position from the outer circumferential side of slot number 55 become an output wire (O) and a neutral-point lead wire (N), respectively, of the stator winding portion 161B.

The b-phase winding portion, which has two turns, and the c-phase winding portion, which also has two turns, are formed in a similar manner to the stator winding portion 161B.

Although in this embodiment the winding assembly, which is composed of one phase of stator winding portion 161B having two turns, is constructed by connecting the first winding sub-portion 31a nd the second winding sub-portion 32 inversely wound with a phase difference corresponding to an electrical angle of 180°, this embodiment can also achieve the same effects as Embodiment 1 above. That is, the stator winding 16 is completely installed in the slots 15a of the laminated body 36 before the end surfaces of the laminated body 36 are abutted, eliminating the need for troublesome operations such as inserting portions of the stator winding 16 into the slots 15a after bending and forming the stator core 15.

Furthermore, the stator winding 16 can be installed in all of the slots 15a of the stator core 15 when the opening portions of the slots 15a are wide, enabling the space factor of the strands of wire 30 in the cylindrical stator core to be increased in proportion to the difference in the width of the opening portions of the slots 15a compared to when the stator winding is installed in the slots after forming the cylindrical shape.

Embodiment 5

Figure 24:
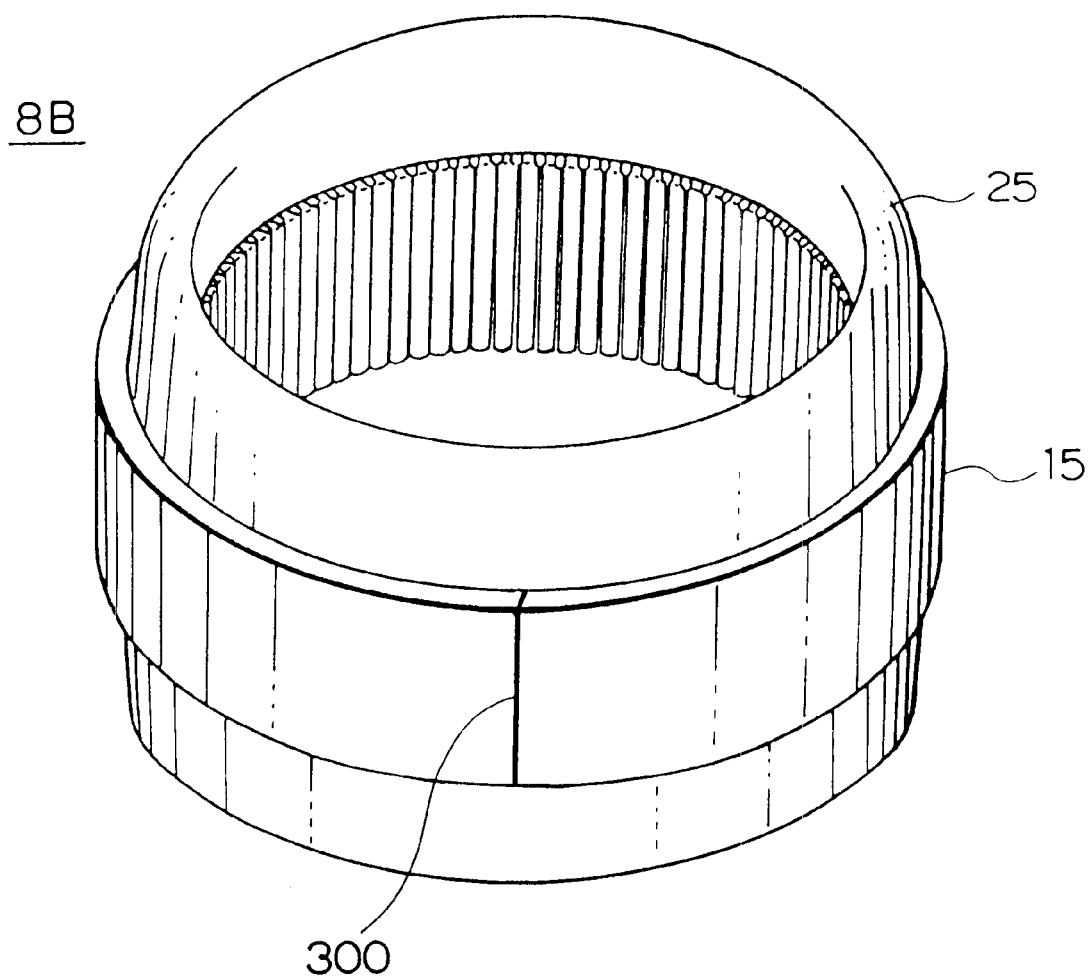
FIG. 24 is a perspective of a stator used in an automotive alternator according to Embodiment 5 of the present invention.

FIG. 24 is a perspective of a stator 8B of an automotive alternator according to Embodiment 5 of the present invention. The stator 8B differs from the stator 8 in Embodiment 1 in that the coil end portions 16a and 16b are integrally molded in an electrically-insulative resin 25. The electrically-insulative resin 25 is a mixture of epoxy resin (principal component) having a thermal conductivity of 0.5 (W/mk) and alumina having a thermal conductivity of 3.5 (W/mk) in a ratio of one to four (1:4). Moreover, the output wires and neutral-point lead wires of each phase have been omitted from the drawing.

In this embodiment, because the connection portions are coated with the electrically-insulative resin 25, the connection portions are reliably insulated, improving insulation, and resistance to vibration in the connection portions is improved.

Embodiment 6

Figure 25:
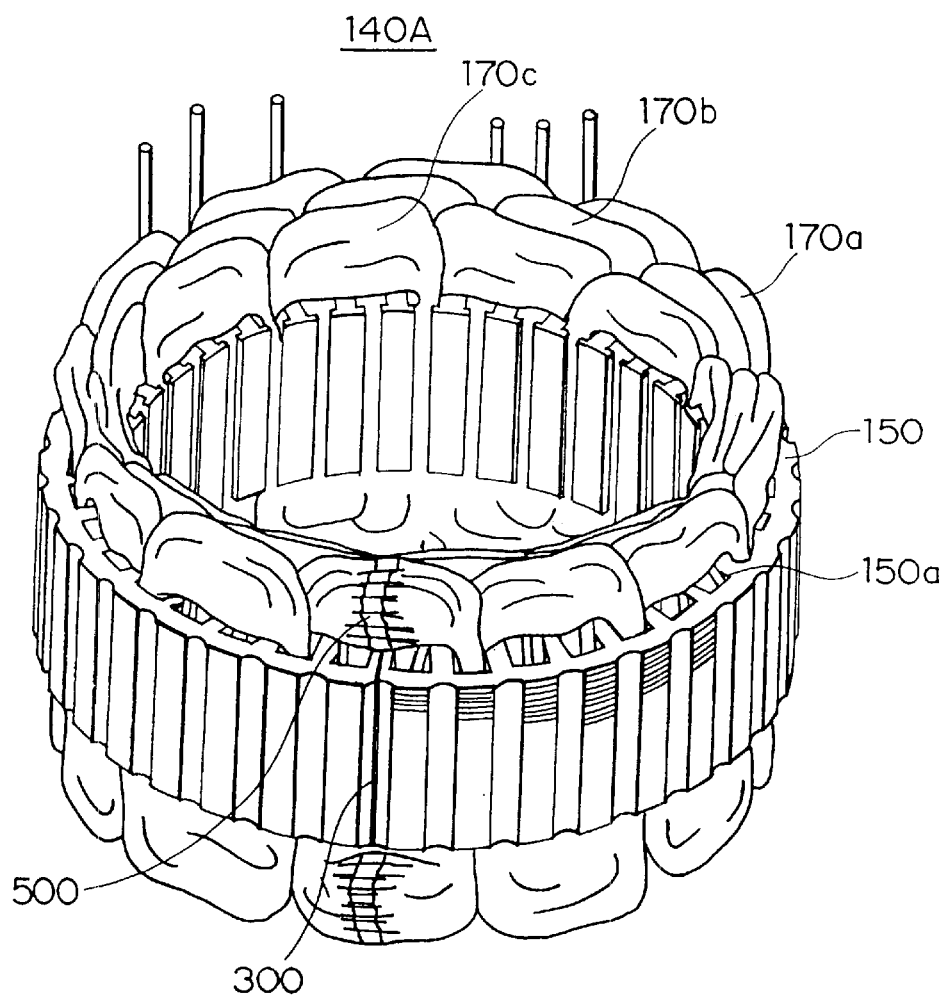
FIG. 25 is a perspective of a stator used in an automotive alternator according to Embodiment 6 of the present invention.

FIG. 25 is an overall perspective of a stator 140A of an automotive alternator according to Embodiment 6 of the present invention.

Figure 27:
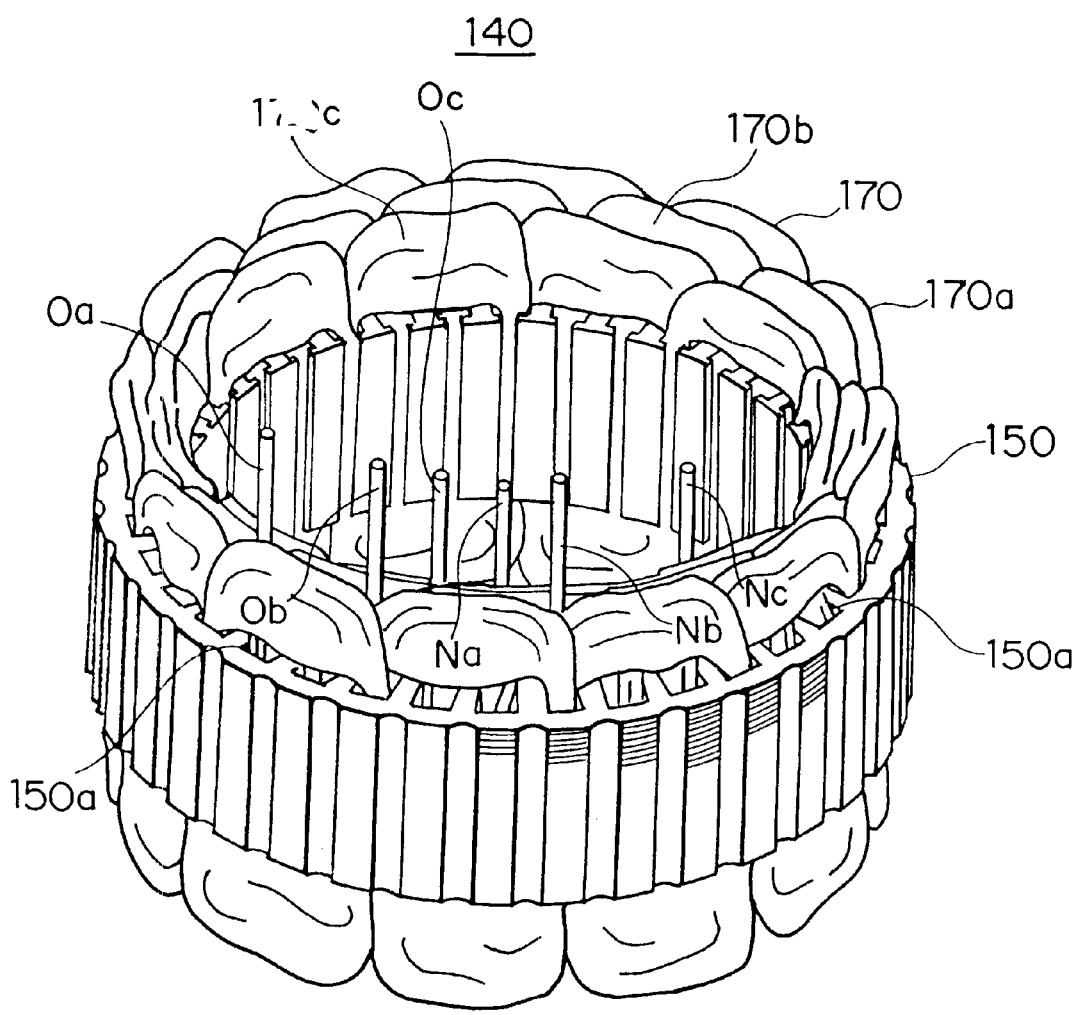
FIG. 27 is a perspective of a stator of a conventional automotive alternator.
Figure 28:
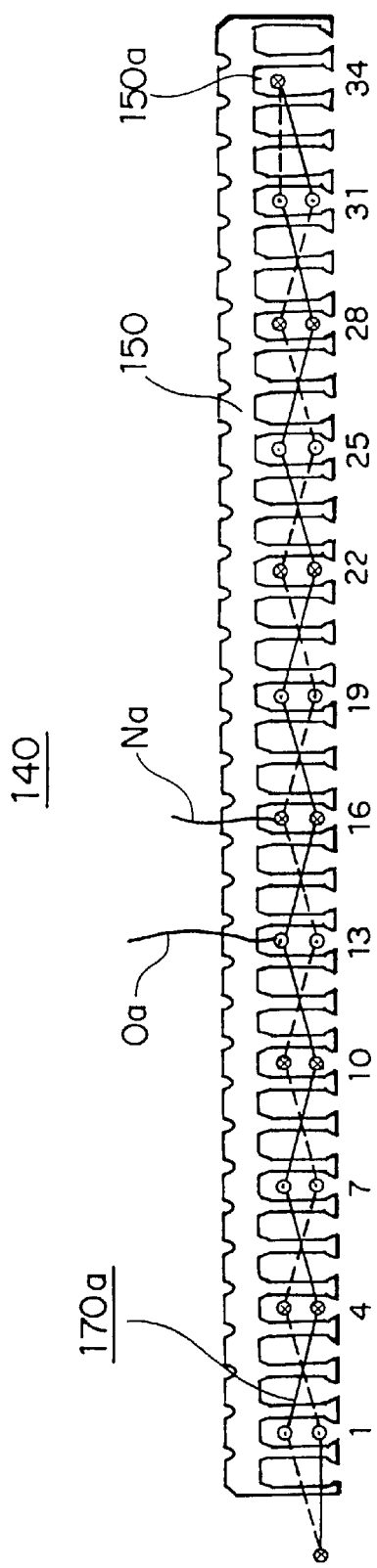
FIG. 28 is a diagram explaining connections in one phase of a stator winding in FIG. 27.
Figure 29:
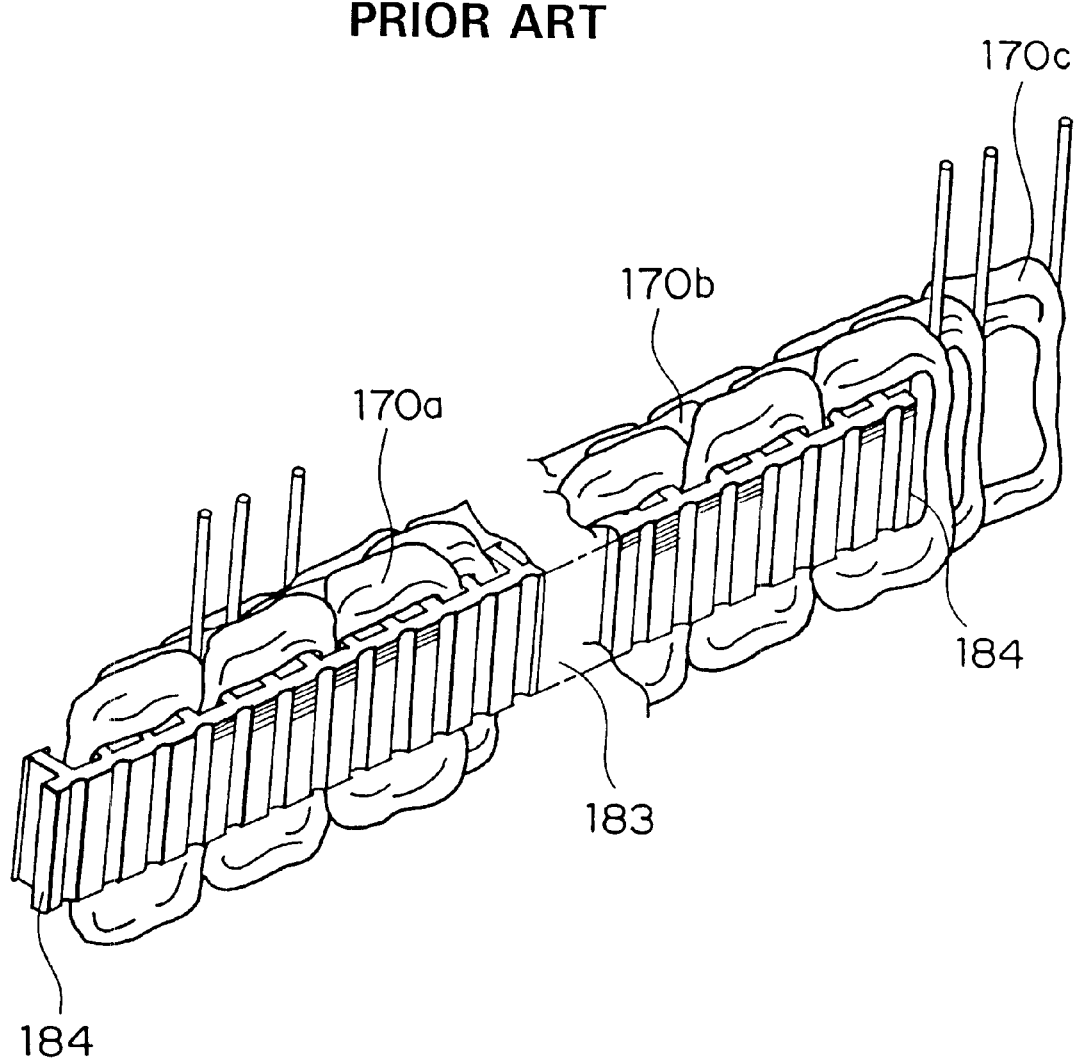
FIG. 29 is a perspective of the stator in FIG. 27 during manufacture.

In the stator 140A, the stator winding 170 of the stator core 140 in FIG. 27 explained previously is provided with the winding connection portion 500, and a stator core 150 is provided with the core abutting portions 300 which are axially aligned with the winding connection portion 500.

Figure 26:
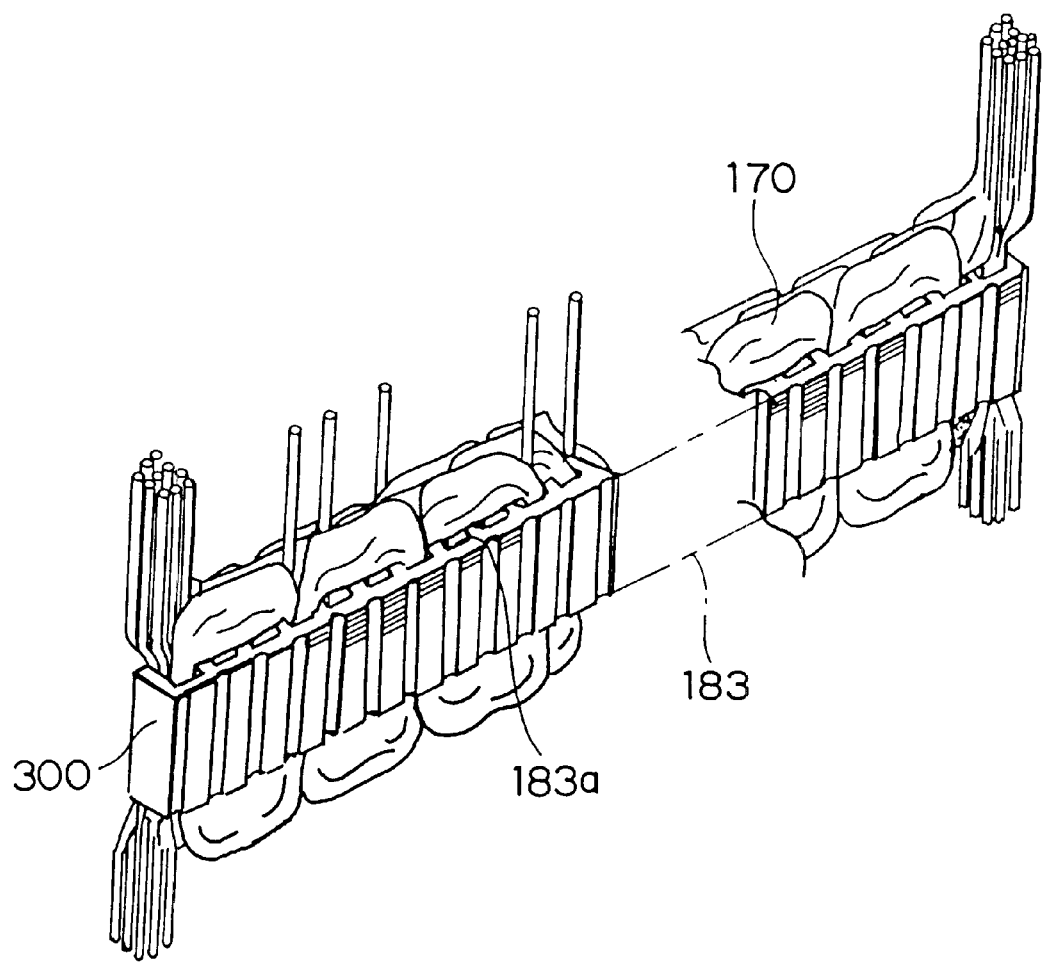
FIG. 26 is a perspective of the stator in FIG. 25 during manufacture.

In Embodiment 6, as shown in FIG. 26, the stator winding 170 is completely installed in slots 183a of a laminated body 183 before the end surfaces of the laminated body 183 are abutted, eliminating the need for troublesome operations such as inserting portions of the stator winding 170 into the slots 15a after bending and forming the stator core 150.

As explained above, an alternator comprising: a rotor for forming north-seeking (N) and south-seeking (S) poles alternately about a rotational circumference; and a stator comprising:
    a stator core surrounding the rotor; and
    a polyphase stator winding installed in the stator core,
the stator core being formed with a number of slots extending axially at a predetermined pitch in a circumferential direction,
the stator core being provided with a core abutting portion extending axially such that the stator core becomes an annular shape by abutting end surfaces of a parallelepiped laminated body, and
the polyphase stator winding is provided with a winding connection portion axially aligned with the core abutting portion.

Therefore, the polyphase stator winding is installed in all of the slots of the stator core before abutting, eliminating the need for the troublesome operation of installing portions of the polyphase stator winding into the slots after abutting.

Furthermore, the polyphase stator winding can be installed in all of the slots of the stator core when the opening portions of the slots are wide, enabling the circumferential width of the strands of wire constituting the winding, which are inserted into the slots, to be increased in size compared to when they are inserted after abutting, thereby increasing the space factor.

According to one form of the alternator, the polyphase stator winding may be provided with a winding assembly in which one phase of stator winding portion has two turns formed by connecting:

a first winding sub-portion in which a long strand of wire is wound so as to alternately occupy an inner layer and an outer layer in a slot depth direction within the slots at intervals of a predetermined number of slots, the strand of wire folding back outside said slots at axial end surfaces of the stator core; and a second winding sub-portion in which a long strand of wire is wound so as to alternately occupy an outer layer and an inner layer in a slot depth direction within said slots at intervals of a predetermined number of slots, the strand of wire folding back outside the slots at axial end surfaces of said stator core, the second winding sub-portion being inversely wound at a phase difference corresponding to an electrical angle of 180° to said first winding sub-portion.

Therefore, the first winding sub-portion and the second winding sub-portion are aligned at the winding connection portion, facilitating electrical connection.

According to another form of the alternator, the phase stator winding may be provided with overlapping sets of winding assemblies, in which each phase of the stator winding portions has four turns formed by connecting each of the winding sub-portions in the two sets of winding assemblies in series.

Therefore, the first to fourth winding sub-portions are aligned at the winding connection portion, facilitating electrical connection.

According to still another form of the alternator, the two sets of winding assemblies may be wound into the stator core by stacking one on top of the other radially.

Therefore, the stator can be assembled by installing the winding assemblies into the stator core in order, simplifying the manufacturing of the stator.

According to still another form of the alternator, the two sets of winding assemblies may be wound into the stator core such that a first of the winding assemblies envelops a second of the winding assemblies.

Therefore, electrical connection of the first to fourth winding sub-portions is facilitated at the winding connection portion.

According to still another form of the alternator, an end portion of a winding sub-portion in a first position from an inner circumferential side of the slots may be electrically connected to an end portion of a winding sub-portion in a fourth position from the inner circumferential side of the slots and an end portion of a winding sub-portion in a second position from the inner circumferential side of the slots may be electrically connected to an end portion of a winding sub-portion in a third position from the inner circumferential side of the slots at the winding connection portion.

Therefore, the welding operation can be performed by interposing metal terminals between the end portions, for example, eliminating the need to purposely form the end portions of the winding sub-portions for electrical connection.

According to still another form of the alternator, the an end portion of a winding sub-portion in a first position from an inner circumferential side of the slots may be electrically connected to an end portion of a winding sub-portion in a second position from the inner circumferential side of the slots and an end portion of a winding sub-portion in a third position from the inner circumferential side of the slots may be electrically connected to an end portion of a winding sub-portion in a fourth position from the inner circumferential side of the slots at the winding connection portion.

Therefore, electrical connection is facilitated by connecting end portions of adjacent winding sub-portions. Furthermore, the axial length of the end portions can be kept short.

According to still another form of the alternator, the winding connection portion may extend axially before electrical connection.

Therefore, electrical connection is facilitated.

According to still another form of the alternator, the electrical connection at the winding connection portion may be by welding.

Therefore, the winding connection portion is reliably joined, improving the reliability of the winding connection portion.

According to still another form of the alternator, the winding connection portion may be coated with resin.

Therefore, the winding connection portion is reliably insulated, improving insulation, and also improving vibration resistance at the winding connection portion.

What is claimed is:

1. An alternator comprising:
    a rotor for forming north-seeking (N) and south-seeking (S) poles alternately about a rotational circumference; and
    a stator comprising:
        a stator core surrounding said rotor; and
        a polyphase stator winding installed in said stator core,
    said stator core being formed with a number of slots extending axially at a predetermined pitch in a circumferential direction,
    said stator core being provided with a core abutting portion extending axially such that said stator core becomes an annular shape by abutting end surfaces of a parallelepiped laminated body, and
    said polyphase stator winding is provided with a winding connection portion axially aligned with said core abutting portion.

2. The alternator according to claim 1 wherein said polyphase stator winding is provided with a winding assembly in which one phase of stator winding portion has two turns formed by connecting:
    a first winding sub-portion in which a long strand of wire is wound so as to alternately occupy an inner layer and an outer layer in a slot depth direction within said slots at intervals of a predetermined number of slots, said strand of wire folding back outside said slots at axial end surfaces of said stator core; and
    a second winding sub-portion in which a long strand of wire is wound so as to alternately occupy an outer layer and an inner layer in a slot depth direction within said slots at intervals of a predetermined number of slots, said strand of wire folding back outside said slots at axial end surfaces of said stator core,
    said second winding sub-portion being inversely wound at a phase difference corresponding to an electrical angle of 180° to said first winding sub-portion.

3. The alternator according to claim 2 wherein said polyphase stator winding is provided with two overlapping sets of winding assemblies, in which each phase of said stator winding portions has four turns formed by connecting each of said winding sub-portions in said two sets of winding assemblies in series.

4. The alternator according to claim 3 wherein said two sets of winding assemblies are wound into said stator core by stacking one on top of the other radially.

5. The alternator according to claim 3 wherein said two sets of winding assemblies are wound into said stator core such that a first of said winding assemblies envelops a second of said winding assemblies.

6. The alternator according to claim 3 wherein an end portion of a winding sub-portion in a first position from an inner circumferential side of said slots is electrically connected to an end portion of a winding sub-portion in a fourth position from the inner circumferential side of said slots and an end portion of a winding sub-portion in a second position from the inner circumferential side of said slots is electrically connected to an end portion of a winding sub-portion in a third position from the inner circumferential side of said slots at said winding connection portion.

7. The alternator according to claim 3 wherein an end portion of a winding sub-portion in a first position from an inner circumferential side of said slots is electrically connected to an end portion of a winding sub-portion in a second position from the inner circumferential side of said slots and an end portion of a winding sub-portion in a third position from the inner circumferential side of said slots is electrically connected to an end portion of a winding sub-portion in a fourth position from the inner circumferential side of said slots at said winding connection portion.

8. The alternator according to claim 1 wherein said winding connection portion extends axially before electrical connection.

9. The alternator according to claim 1 wherein electrical connection at said winding connection portion is by welding.

10. The alternator according to claim 1 wherein said winding connection portion is coated with resin.

11. The alternator according to claim 1, wherein said winding connection portion comprises at least two winding sub-portions, and wherein metal terminals are interposed between each of said at least two winding sub-portions, thereby enabling end portions of said at least two winding sub-portions to be electrically connected.

12. An alternator comprising:
a rotor for forming north-seeking (N) and south-seeking (S) poles alternately about a rotational circumference; and
a stator comprising
a stator core surrounding said rotor, and
a polyphase stator winding installed in said stator core,
said stator core being formed with a number of slots extending axially at a predetermined pitch in a circumferential direction;
wherein said polyphase stator winding is provided with a winding assembly in which one phase of a stator winding portion has two turns formed by connecting:
a first winding sub-portion in which a long strand of wire is wound so as to alternately occupy an inner layer and an outer layer in a slot depth direction within said slots at intervals of a predetermined number of slots, said strand of wire folding back outside said slots at axial end surfaces of said stator core, and
a second winding sub-portion in which a long strand of wire is wound so as to alternately occupy an outer layer and an inner layer in a slot depth direction within said slots at intervals of a predetermined number of slots, said strand of wire folding back outside said slots at axial end surfaces of said stator core,
said second winding sub-portion being inversely wound at a phase difference corresponding to an electrical angle of 180° to said first winding sub-portion.

13. An alternator comprising:
a rotor for forming north-seeking (N) and south-seeking (S) poles alternately about a rotational circumference; and
a stator comprising
a stator core facing said rotor, and
a polyphase stator winding installed in said stator core,
said stator core being formed with a number of slots extending axially at a predetermined pitch in a circumferential direction;
wherein said polyphase stator winding is provided with a winding assembly in which one phase of a stator winding portion has two turns formed by connecting:
a first winding sub-portion in which a long strand of wire is wound so as to alternately occupy an inner layer and an outer layer in a slot depth direction within said slots at intervals of a predetermined number of slots, said strand of wire folding back outside said slots at axial end surfaces of said stator core, and
a second winding sub-portion in which a long strand of wire is wound so as to alternately occupy an outer layer and an inner layer in a slot depth direction within said slots at intervals of a predetermined number of slots, said strand of wire folding back outside said slots at axial end surfaces of said stator core.

* * * * *